(12) United States Patent
Ozaki et al.

(10) Patent No.: US 7,562,164 B2
(45) Date of Patent: Jul. 14, 2009

(54) REMOTE TERMINAL APPARATUS FOR PROGRAMMABLE CONTROLLER

(75) Inventors: Toshiyuki Ozaki, Ritto (JP); Shintaro Ueno, Kusatsu (JP)

(73) Assignee: Omron Corporation, Kyoto-Shi (JP)

( * ) Notice: Subject to any disclaimer, the term of this patent is extended or adjusted under 35 U.S.C. 154(b) by 146 days.

(21) Appl. No.: 11/517,590

(22) Filed: Sep. 8, 2006

(65) Prior Publication Data

US 2007/0073912 A1 Mar. 29, 2007

(30) Foreign Application Priority Data

Sep. 9, 2005 (JP) .............................. 2005-262066
Sep. 1, 2006 (JP) .............................. 2006-237449

(51) Int. Cl.
*G06F 3/00* (2006.01)
(52) U.S. Cl. ....................................................... 710/16
(58) Field of Classification Search ..................... 710/16
See application file for complete search history.

(56) References Cited

U.S. PATENT DOCUMENTS

| 6,016,523 | A | 1/2000 | Zimmerman et al. | |
|---|---|---|---|---|
| 6,449,715 | B1 | 9/2002 | Krivoshein | |
| 2002/0073411 | A1 * | 6/2002 | Tsunedomi et al. | 717/171 |

FOREIGN PATENT DOCUMENTS

| DE | 195 35 277 | 11/1996 |
|---|---|---|
| EP | 1 211 582 | 6/2002 |
| JP | 2004-280304 | 7/2004 |
| WO | WO-01/23971 | 5/2001 |
| WO | WO-2006/018345 | 2/2006 |

OTHER PUBLICATIONS

'Total life cycle web-integrated control', Aug. 18, 2003, Information Society Technology, V1.7, pp. 1-147.*
Automation TEAM—I/O Systems, 1 page, http://www.br-automation.com/cps/rde/xchg/br-productcatalogue/hs.xsl/products_6136/_ENG_HTML.htm?session_level_1=I/O%20Systems.
X20 System Modules, Digital Input Modules—D12371, pp. 158-163.

* cited by examiner

*Primary Examiner*—Henry W. H. Tsai
*Assistant Examiner*—Hyun Nam
(74) *Attorney, Agent, or Firm*—Foley & Lardner LLP

(57) ABSTRACT

A programmable-controller remote terminal apparatus of the invention shortens a system down time generated in replacing an I/O unit, in the I/O unit having a three-divided configuration of a remote terminal apparatus in which miniaturization and low-profile are developed. A programmable-controller remote terminal apparatus, which is connected to a programmable controller through a fieldbus, includes a communication unit and at least one I/O unit which can communicate with the communication unit through a serial bus line, wherein the communication unit has a device which obtains unit information for identifying each connected I/O unit and setting value information set in each I/O unit, and the communication unit has a backup device which can store the obtained unit information and setting value information of each I/O unit in a storage medium included in the communication unit.

4 Claims, 18 Drawing Sheets

(Viewed from obliquely upper right)   (Viewed from obliquely upper left)

Communication unit (main apparatus)

(Viewed from obliquely upper right)   (Viewed from obliquely upper left)

Communication unit (additional apparatus)

Coupled state

Separated state

Coupled state

Separated state

End unit (main apparatus)

End unit (additional apparatus)

US 7,562,164 B2

REMOTE TERMINAL APPARATUS FOR PROGRAMMABLE CONTROLLER

This application claims priority from Japanese patent applications 2005-262066, filed on Sep. 9, 2005 and 2006-237449, filed on Sep. 1, 2006. The entire contents of the aforementioned applications are incorporated herein by reference.

BACKGROUND OF THE INVENTION

1. Field of the Invention

The present invention relates to a remote terminal apparatus of a programmable controller (hereinafter referred to as "PLC"), particularly to a building block type remote terminal apparatus in which an input and output unit (hereinafter referred to as I/O unit) can arbitrarily be added.

2. Description of the Related Art

There is well known a remote terminal apparatus connected to a PLC through a fieldbus, particularly a building block type remote terminal apparatus that includes one communication unit and at least one I/O unit capable of communicating with the communication unit through a serial bus, and in which an I/O unit may arbitrarily be added.

As this kind of building block type remote terminal apparatus, a building block type remote terminal apparatus with back plane and a building block type remote terminal apparatus without back plane are well known. In the building block type remote terminal apparatus with back plane, each I/O unit is attached to a conductive pattern laid on the back plane through a connector. The building block type remote terminal apparatus with back plane has an advantage that the communication can be continued without decoupling the serial bus line even in the case where the I/O unit is broken or detached. At the same time, the serial bus line having a length corresponding to the maximum number of connected I/O units is required on the back plane irrespective of the number of connected I/O units, and accordingly, the building block type remote terminal apparatus with back plane has a drawback that the long serial bus line abstracts the space saving.

On the other hand, in the building block type remote terminal apparatus without back plane, a conductive pattern which becomes a part of the serial bus line is laid outside a housing of each I/O unit, and both ends of the partial bus line lead out from right and left side faces of the housing. A set of serial buses is formed after the plural I/O units are connected to one another. Thus, the building block type remote terminal apparatus without back plane has an advantage that a wasted space is not generated, because the length of the serial bus line is set according to the number of connected I/O units. At the same time, when one of the set of I/O units is broken and removed, the serial bus is decoupled, which causes the drawback that the communication can not be continued.

Therefore, there is well known an I/O unit in which the whole of the I/O unit is divided into a base block including a serial bus line portion and a circuit block with terminal support including a circuit board and a input and output terminal support. The I/O unit having the two-divided configuration has an advantage that only the circuit block with terminal support is detached while the serial bus is not decoupled even if the break-down is generated in the circuit board. However, even in this case, in order to replace the circuit block with terminal support, there is a drawback that the wiring connected to the terminal support is laid again.

Recently there is proposed an I/O unit has the configuration in which the whole is divided into three by dividing the circuit block with terminal support into a main-body block including a communication control circuit and an input and output control circuit and a terminal block including a terminal support (refer to, for example, URL of a page explaining "X20 System" which is a product of B&R company: http://www.br-automation.com/cps/rde/xchg/SID-OA2B820A-4D98584C/br-automation_com/hs.xsl/cookies_allowed.htm?caller=556__5358_ENG_HTML.htm).

In the I/O unit having the three-divided configuration, the coupling is released between the terminal support block and the main-body block, and the coupling is released between the main-body block and the terminal support block. Therefore, the I/O unit having the three-divided configuration has an advantage that only the main-body block can easily be replaced while the terminal support wiring remains in the connected state.

FIG. 18 shows a view for explaining the conventional network. Referring to FIG. 18, the numeral 60 designates a tool placed on a network, the numeral 61 designates an upper communication, the numeral 62 designates a communication unit, and the numeral 63 designates an I/O unit. As shown in FIG. 18, the communication unit 62 includes an MPU 621, and the MPU 621 is connected to an I/O MPU 631 included in each I/O unit through an internal serial bus 64. In FIG. 18, the numeral 632 designates a setting switch built in the I/O unit 63.

However, in the conventional I/O unit 63 having the three-divided configuration, various pieces of information (various setting values and the like) stored in each I/O unit 63 is stored by the setting switch 632 (for example, DIP switch) of each I/O unit or the tool 60 connected to the upper communication 61. For example, when the I/O unit is replaced due to the failure of the I/O unit, the setting switch 632 is manually changed to the newly replaced I/O unit, or the data is downloaded from the tool 60 through the network.

According to the above technique, in replacing the I/O unit, the setting of switch of the replacement target unit is changed, or the tool is started up to download the stored setting value, which results in a long system down time during the unit replacement.

Because the setting of the I/O unit is manually downloaded, there might be generated a human-induced mistake such as an operation mistake of the setting switch 632. The problem is not limited to the case where I/O unit of the remote terminal apparatus is divided into three, but the problem is also generated in the case where the whole of the I/O unit is divided into the base block including the serial bus line portion and the circuit block with terminal support including the circuit board and the input and output terminal support.

In view of the foregoing, an object of the invention is to be able to perform the setting without using any tool to the newly replaced I/O unit to shorten the down time when the I/O unit is replaced during the current-conducting state or during the down state, in the I/O unit of the remote terminal apparatus in which the miniaturization and low-profile are developed.

Another object of the invention is to be able to securely prevent the human-induced mistake such as the operation error of the setting switch by setting the I/O unit without using any tool.

Other and further object, action, and effect of the invention will become manifest to those skilled in the art upon making reference to the following description.

SUMMARY OF THE INVENTION

In order to solve the above problem, the programmable-controller remote terminal apparatus according to the invention adopts the following configuration.

A programmable-controller remote terminal apparatus of the present invention is connected to a programmable controller through a fieldbus, and includes a communication unit and at least one I/O unit capable of communicating with the communication unit through a serial bus line, wherein the communication unit has a device which obtains unit information for identifying each connected I/O unit and setting value information set in each I/O unit, and the communication unit has a backup device capable of storing the obtained unit information and setting value information of each I/O unit in a storage medium included in the communication unit.

According to the above configuration, the communication unit of the remote terminal apparatus can comprehend the information for identifying the connected I/O unit and the communication unit can store the information in the storage medium included in the communication unit. As used herein "unit information" shall mean information for identifying each I/O unit. In the embodiment, "unit information" corresponds to the information used to determine whether presence or absence of the I/O unit replacement. "Setting value information" shall mean information which a user arbitrarily sets to operate the remote terminal apparatus. In the embodiment, the setting value information corresponds to the backup data.

Further, in the programmable-controller remote terminal apparatus of the invention, the communication unit compares the information obtained by the device which obtains the unit information and setting value information of each connected I/O unit to backup unit information and setting value information, and thereby the communication unit is capable of recognizing the case in which the I/O unit having information different from the backup information exists.

According to the above configuration, for example, in the case where backup data is different from the stored backup data in adding or removing the I/O unit to and from the remote terminal apparatus, the communication unit can recognize the difference.

Further, in the programmable-controller remote terminal apparatus of the invention, the communication unit compares the information obtained by the device which obtains the unit information and setting value information of each connected I/O unit to backup unit information and setting value information, and thereby the communication unit is capable of recognizing the case in which the connected I/O unit is replaced by a different I/O unit, and the communication unit restoration device capable of transferring the stored setting value information on the I/O unit to the newly joined I/O unit by downloading backup data of the replaced I/O unit to the newly joined I/O unit.

According to the above configuration, the communication unit of the remote terminal apparatus can transfer various pieces of information on the setting value of the I/O unit used and the like to the newly replaced I/O unit by downloading the various pieces of information from the backup data, when the replacement of the I/O unit is required due to the failure or the like. The download process is performed to the I/O unit from the recording storage medium in the communication unit, so that the down time can largely be reduced in the whole system. The restoration process is appropriately performed, so that the human-induced mistake can securely be prevented when the data is transferred during the replacement of the I/O unit.

Further, in the programmable-controller remote terminal apparatus of the invention, the communication unit has a restoration condition confirming device which determines whether or not the replaced I/O unit satisfies predetermined restoration conditions, and the communication unit has the restoration device capable of transferring the stored setting value information on the I/O unit to the newly joined I/O unit by downloading the backup data of the replaced I/O unit to the newly joined I/O unit only when the restoration conditions are satisfied. Further, in the programmable-controller remote terminal apparatus of the invention, the predetermined restoration conditions of the restoration condition confirming device are that the I/O unit connected to the communication unit is replaced and the I/O units are the same type before and after the replacement. The determination may be made by utilizing the backup data information. In this case, the restoration conditions are that the I/O unit which is of the target of the backup data is the same model and the serial number is different. That is, the restoration conditions are that the I/O unit is replaced and the I/O units are the same type before and after the replacement.

According to the above configuration, when the predetermined restoration conditions are not satisfied even if the communication unit recognizes that the I/O unit is replaced, the backup data is not downloaded to the newly replaced I/O unit. The setting can prevent malfunction from occurring while the restoration conditions is not performed, for example, in the case where the different type I/O unit is wrongly replaced although the I/O unit is replaced.

As is clear from the above description, according to the programmable-controller remote terminal apparatus of the invention, in the I/O unit of the remote terminal apparatus, the setting can be performed toollessly to shorten the system down time when the I/O unit is replaced during the current-conducting state or during the down state. Furthermore, the human-induced mistake such as the operation error of the switch can also be prevented by appropriately performing the setting process.

DETAILED DESCRIPTION OF THE PREFERRED EMBODIMENTS

Hereinafter, preferred embodiments of a remote terminal apparatus according to the invention will be described in detail with reference to the accompanying drawings.

Figure 1:
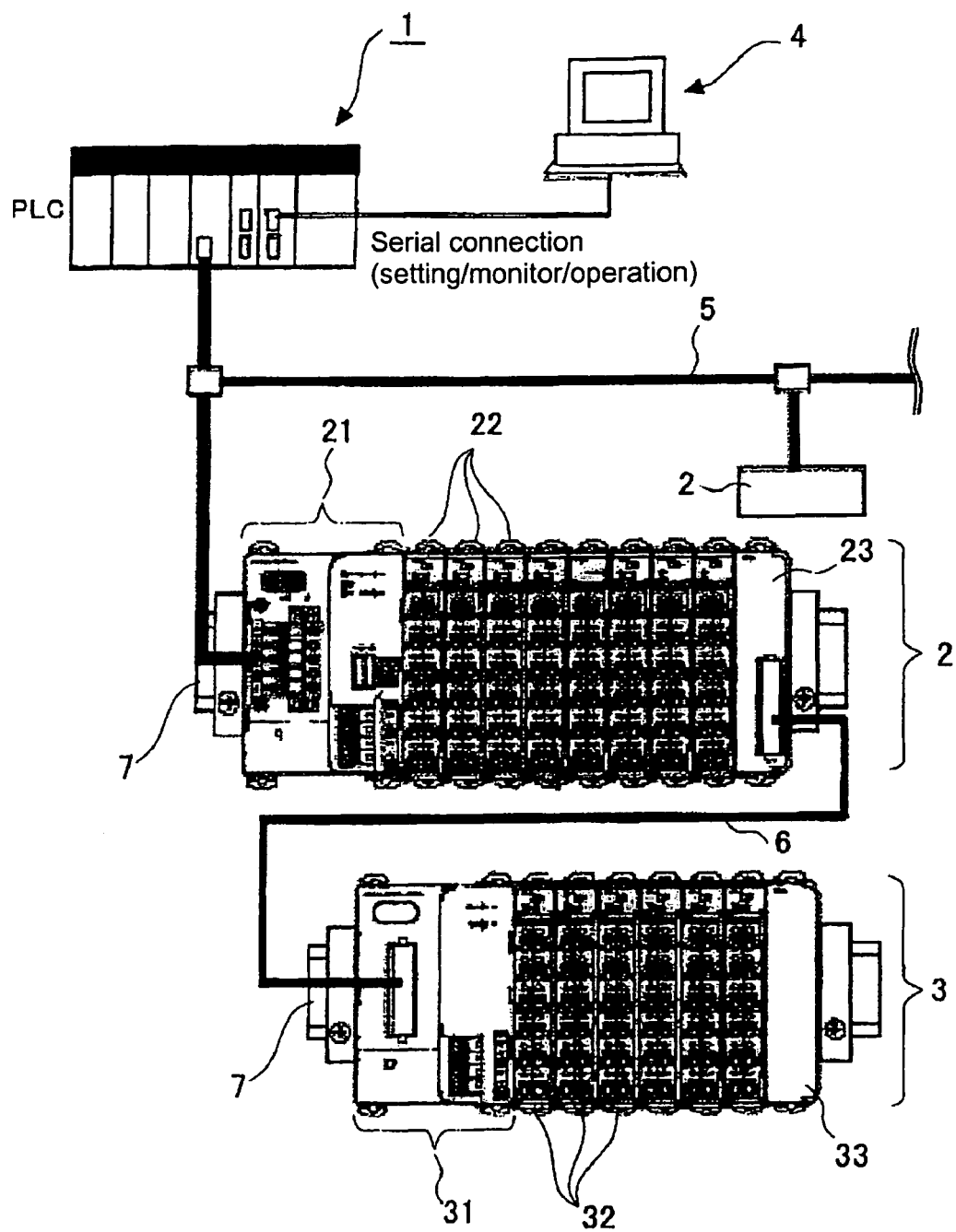
FIG. 1 shows a structural diagram of a whole of PLC system to which the invention is applied.

FIG. 1 shows a structural diagram of the whole of PLC system to which the invention is applied. Referring to FIG. 1, the numeral 1 designates PLC, the numeral 2 designates a remote terminal apparatus (main apparatus), the numeral 3 designates a remote terminal apparatus (additional apparatus), and the numeral 4 designates a personal computer which is used for various settings, a monitor, and operations. A power supply unit, a CPU unit which controls the whole of the PLC system, an I/O unit to which an input device and an output device are connected, a communication master unit which transmits and receives control data to and from the remote terminal apparatus through the fieldbus, and the like are integrally connected in the PLC 1. Each unit performs bus communication with other units through a back plane bus (internal bus). The CPU unit cyclically performs a so-called common process, an I/O refresh process, a user program executing process, and a peripheral service process. The PLC 1 and the remote terminal apparatus (main apparatus) 2 are connected to each other through a fieldbus 5, and the remote terminal apparatus (main apparatus) 2 and the remote terminal apparatus (additional apparatus) 3 are connected to each other through an additional cable 6.

Figure 2:
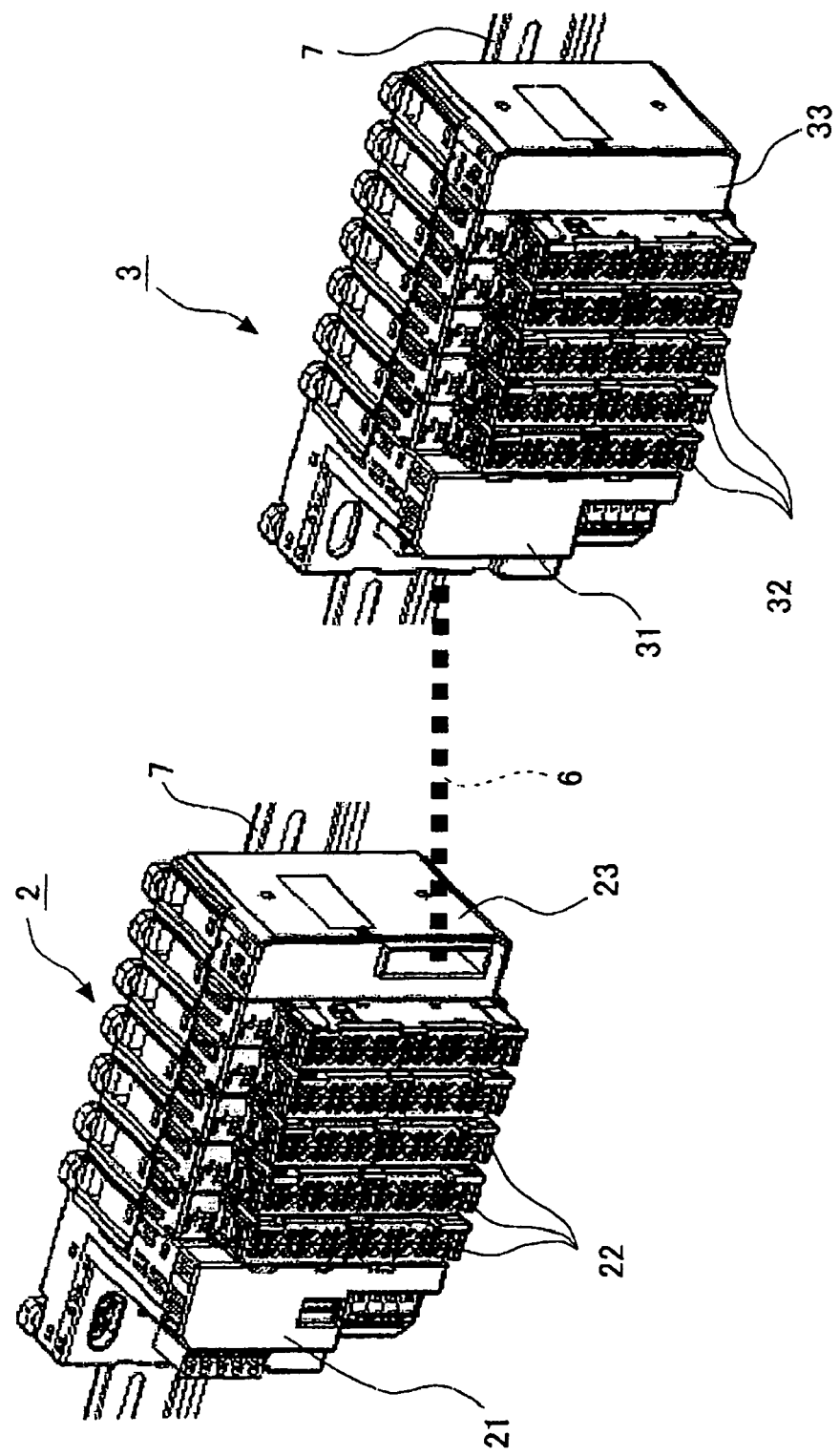
FIG. 2 shows a structural diagram of pieces of remote terminal apparatus (main apparatus and additional apparatus)

As shown in FIGS. 1 and 2, the remote terminal apparatus (main apparatus) 2 includes one communication unit 21, plural I/O units 22 and an END unit 23 with additional connector. As shown in FIG. 1, the units are mechanically coupled to one another and attached to a DIN rail 7 located behind the units. The remote terminal apparatus (additional apparatus) 3 includes one communication unit 31, plural I/O units 32, and an END unit 33 without additional connector. The units are also coupled to one another and attached to the DIN rail 7 located behind the units. An I/O device (although not shown, IN device such as a sensor and a switch and OUT device such as an actuator) is connected to a terminal support of each I/O unit.

In the remote terminal apparatus (main apparatus) 2, the communication unit 21 transmits and receives control data to and from the PLC 1 or the communication unit of PLC 1 through the fieldbus 5. The communication unit 21 communicates with a set of I/O units 22, 22, . . . through an internal serial bus line (not shown) and a unidirectional communication line (not shown). The remote terminal apparatus (main apparatus) 2 has a network address on the fieldbus to communicate with the PLC 1. The PLC 1 becomes a communication master station on the fieldbus, and performs data communication to the network address of the remote terminal apparatus 2. The remote terminal apparatus (main apparatus) 2 and the set of I/O units 22 have network addresses on the internal serial bus line respectively. The remote terminal apparatus (main apparatus) 2 becomes the communication master station on the internal serial bus line, and performs the data communication to the network addresses of the set of I/O units 22. On the other hand, the PLC 1 captures IN data from the I/O unit connected to the back plane, and the PLC 1 captures IN data from the remote terminal apparatus 2 through the fieldbus. This is an IN refresh process. PLC1 executes a user program to perform logic operation of the IN data. This is a user-program executing process. The PLC 1 transmits OUT data which is of the operation result to the I/O unit or remote terminal apparatus 2, which is connected to the back plane. This is an OUT refresh process. Through the succession of processes, the I/O unit receives the OUT data transmitted from the PLC 1 and the I/O unit outputs the OUT data to output device connected to the I/O unit. The remote terminal apparatus (main apparatus) 2 or the remote terminal apparatus (additional apparatus) 3 also receives the OUT data transmitted from the PLC 1, and the remote terminal apparatus 2 transmits the OUT data to the external output device connected to the terminal from the terminal support of the I/O unit 22. The PLC 1 controls the operation of each output device through the succession of operations. The terminal support of the remote terminal apparatus (main apparatus) 2 or the remote terminal apparatus (additional apparatus) 3 transmits the IN data, captured from the input device connected to the terminal support, to the PLC 1 again. The I/O unit connected to the back plane also transmits the IN data to the PLC 1. The PLC 1 captures the IN data of each input device to perform the IN refresh process. Then, the PLC 1 cyclically performs the user-program executing process and the OUT refresh process. An advantage of the use of the remote terminal apparatus (main apparatus) 2 will be described below. Although the input device and output device are connected to the I/O unit connected to the back plane, the I/O unit can deal with only the input device and output device which are located near the PLC 1 because the I/O unit is integrally connected to the PLC 1. On the other hand, because the remote terminal apparatus (main apparatus) 2 is connected to the PLC 1 through the fieldbus, the remote terminal apparatus 2 can deal with the input device and output device which are located far away from the PLC 1. Therefore, the remote terminal apparatus 2 has the advantage that the remote terminal apparatus 2 can deal with various instruments.

As described in detail later, a so-called back plane-less type of unit connection structure is adopted as the unit connection structure in each of the remote terminal apparatus (main apparatus) 2 and the remote terminal apparatus (additional apparatus) 3.

Therefore, a partial bus conductor constituting a part of the bus line is built in each housing of the sets of I/O units 22 or 32. Both ends of the partial bus conductor lead to a row of contactors provided on both side faces of the housing. Accordingly, when the I/O units 22 or 32 are connected to each other, the contactors are electrically connected to complete the set of serial bus lines and unidirectional serial communication lines.

Figure 3A:
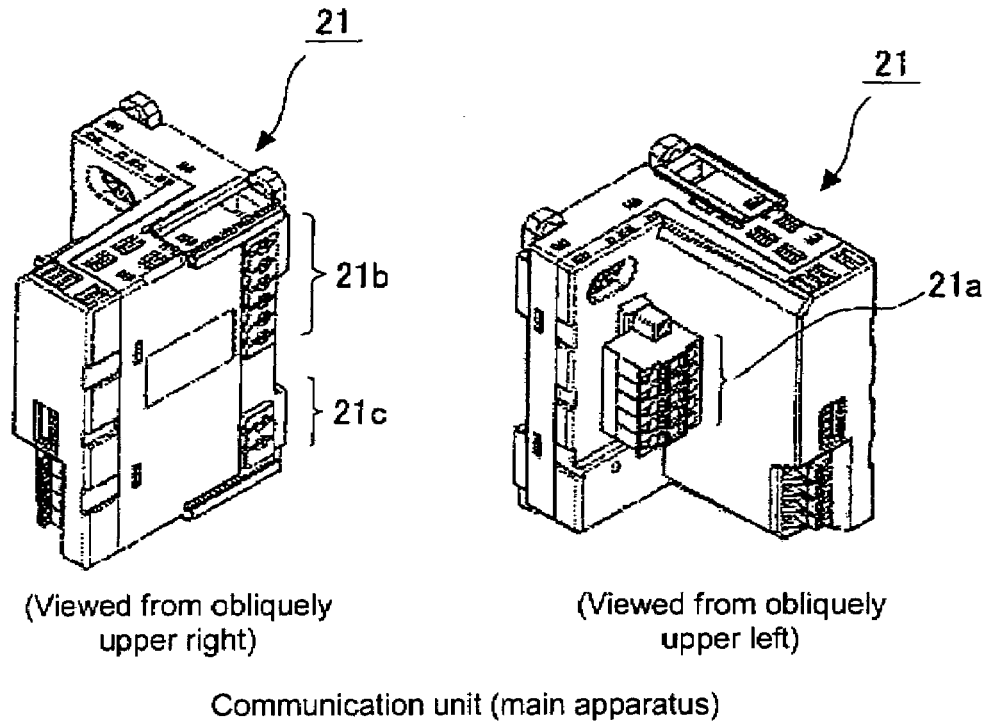
FIGS. 3A and 3B show perspective views of an external appearance of a communication unit.

FIG. 3 shows a perspective view of an external appearance of the communication unit. As shown in FIG. 3A, the communication unit (main apparatus) 21 has an L-shape housing. A connector 21a which is connected to the fieldbus leading to the PLC 1 is provided in a portion corresponding to the inside of the L-shape housing. A row of contactors 21 b constituting the serial bus line and a row of contactors 21c constituting the unidirectional serial communication line are provided in a surface which. is in contact with a left side face of the I/O unit 22.

Figure 3B:
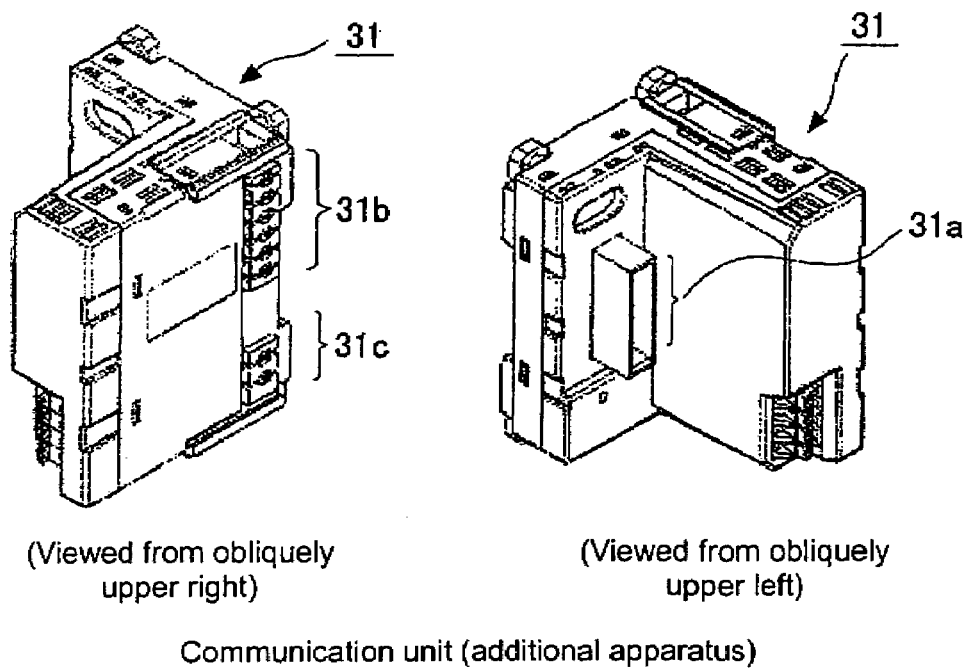

Similarly, as shown in FIG. 3B, the communication unit (additional apparatus) 31 has an L-shape housing. A connector 31a which is connected to an additional cable 6 is provided in a portion corresponding to the inside of the L-shape housing. A row of contactors 31b constituting the serial bus line and a row of contactors 31c constituting a power supply line for performing electric power supply are provided in a surface which is in contact with a left side face of the I/O unit 32.

Figure 4A:
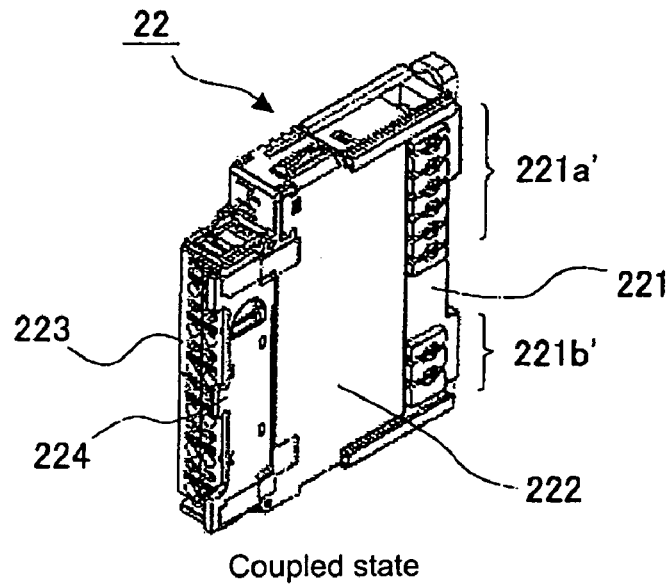
FIGS. 4A and 4B show perspective views of an I/O unit when viewed from an obliquely upper right.
Figure 4B:
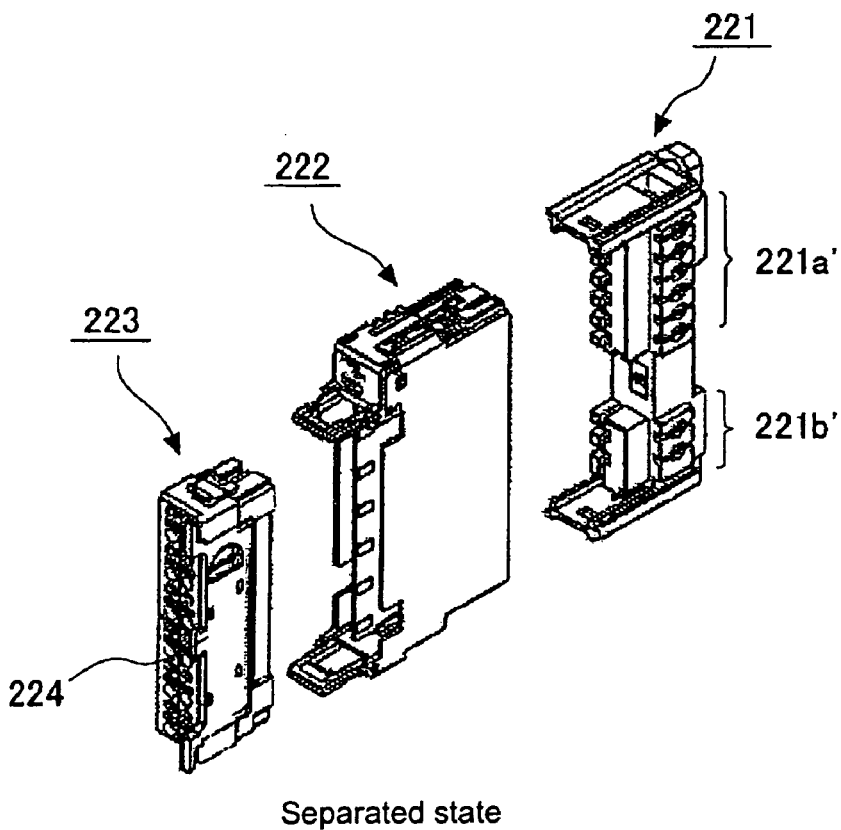
Figure 5A:
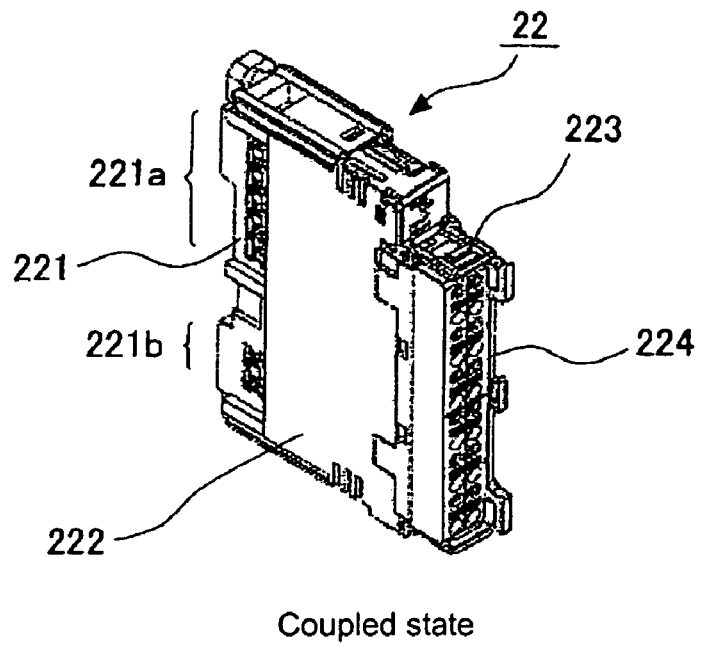
FIGS. 5A and 5B show perspective views of the I/O unit when viewed from an obliquely upper left.
Figure 5B:
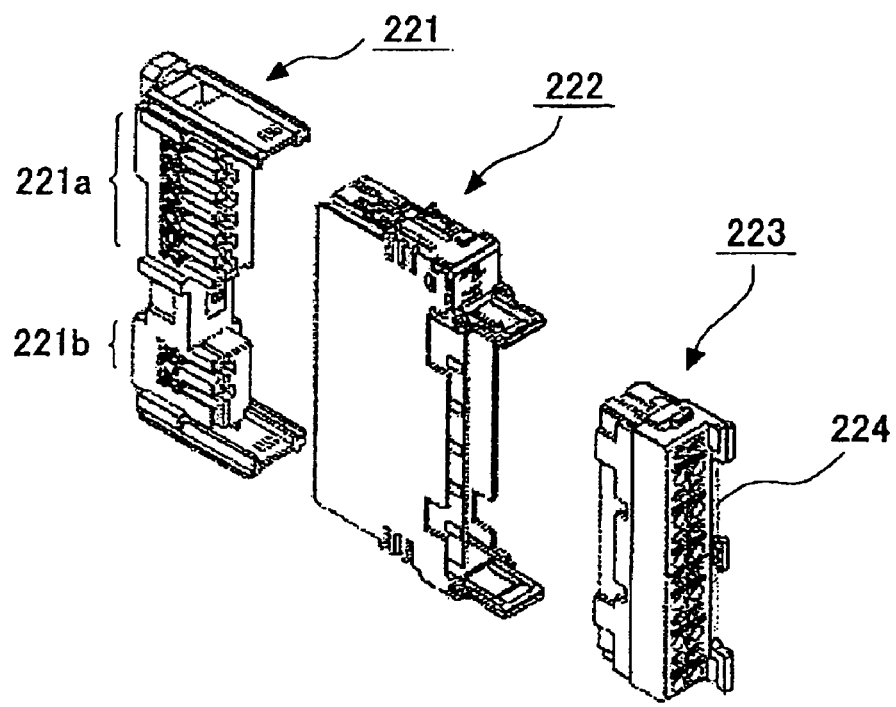

FIG. 4 shows a perspective view of the I/O unit when viewed from an obliquely upper right, and FIG. 5 shows a perspective view of the I/O unit when viewed from an obliquely upper left. FIGS. 4A and 5A show the coupled state, and FIGS. 4B and 5B show the separated state.

As is clear from the drawings, the I/O unit 22 of the remote terminal apparatus (main apparatus) 2 is configured to be divided into three pieces of a base block 221, a main-body block 222, and a terminal support block 223. As is clear from the drawings with FIG. 6, each partial bus into which the serial bus line is divided is built in the base block 221, and each end portion of the partial bus leads to a row of upstream-side contactors 221a and a row of downstream-side contactors 221a'. Similarly, each partial bus into which the unidirectional serial communication line is divided is built in the base block 221, and each end portion of the partial bus leads to a row of upstream-side contactors 221 b and a row of downstream-side contactors 221b'. Therefore, the left side face of the I/O unit 22 corresponds to the right side face of the communication unit 21, and the rows of contactors are coupled to each other to complete the serial bus line and the unidirectional serial communication line when the END unit 23 is attached to the final stage of the I/O unit 22 such that the plural I/O units 22 are arranged adjacent to one another in parallel.

Although the detailed description is not performed because of a little relationship with the invention, the unidirectional serial communication line is used to transmit the unit address data in a bucket-brigade manner, and a unit-address automatic allocation function is realized by repeating an increment process by a predetermined address in each I/O unit 22.

Figure 6:
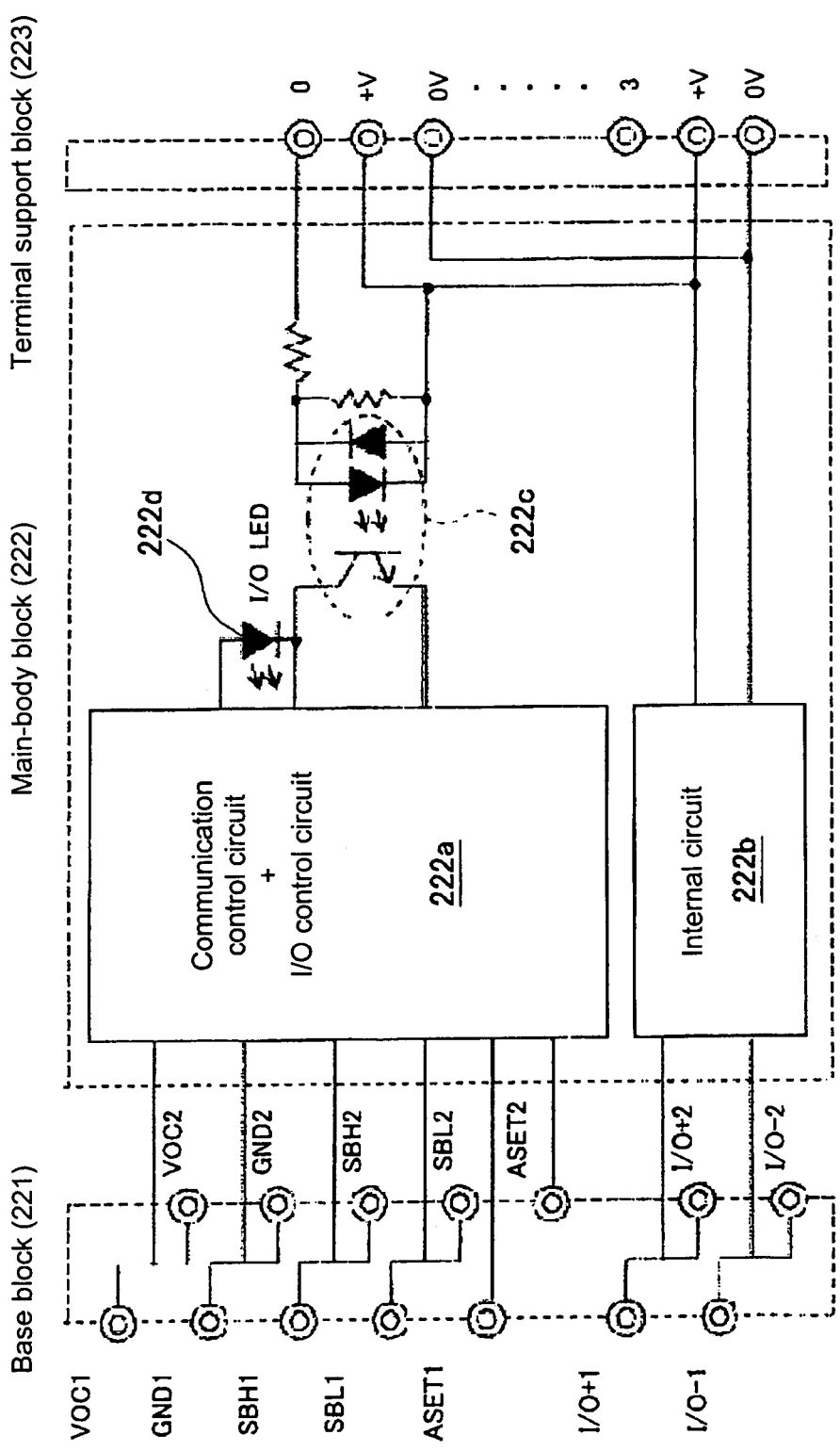
FIG. 6 shows a circuit diagram of an electric configuration inside the I/O unit.

As shown in FIG. 6, the main-body block 222 includes a main-body circuit 222a which has a communication control circuit and an I/O control circuit, an internal circuit 222b which plays a role in automatically allocating the unit address and in performing the bucket-brigade process, a photocoupler 222c which separates the main-body block 222 and the terminal support block 223 in an electrically insulating manner, and a light emitting diode 222d which functions as an operation indicating light.

The terminal support block 223 includes the terminal support. As described in detail later, a type of terminal support (hereinafter referred to as clamp type terminal support) is adopted as the terminal support. In the clamp type terminal support, the inserted electric wire is fixed by clamping the electric wire with a built-in clamp mechanism in order to save a space. Therefore, an occupied area on the terminal support is extremely small, and it is very difficult that a label adheres or terminal information is described near each electric wire socket of the terminal support.

Figure 7A:
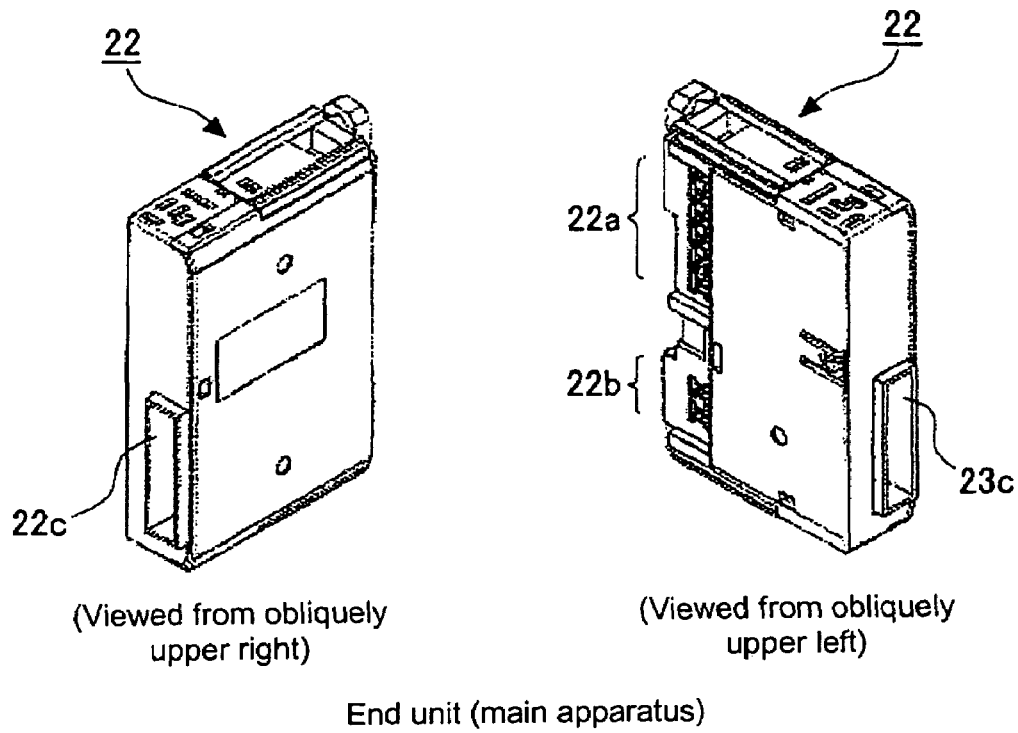
FIGS. 7A and 7B show perspective views of an external appearance of an END unit.

FIG. 7 shows a perspective view of the external appearance of the END unit. As shown in FIG. 4A, END unit (main apparatus) 23 has a flat rectangular shape housing, and rows of contactors 23a and 23b are arranged in the left side face of the housing while aligned with rows of rows of contactors 221a' and 221b' arranged in the right side face of the I/O unit 22. An antireflection process is performed to the inside of the row of contactors 23a through a terminal resistance, the row of contactors 23b is placed to GND therein. On the other hand, in each I/O unit 22, the row of contactors 221b' is pulled up to the power supply through a resistance. Additionally a potential of the row of contactors 221b' is utilized for an END-unit determination process. Therefore, when the END unit 23 is attached to the terminal of the row of connected I/O units 22, the potential of the row of contactors 221b' is pulled down to a "H" level, and the I/O unit 22 can recognize that the I/O unit 22 is the END unit based on the pull-down. In FIG. 4A, the numeral 22c designates an additional connector.

Figure 7B:
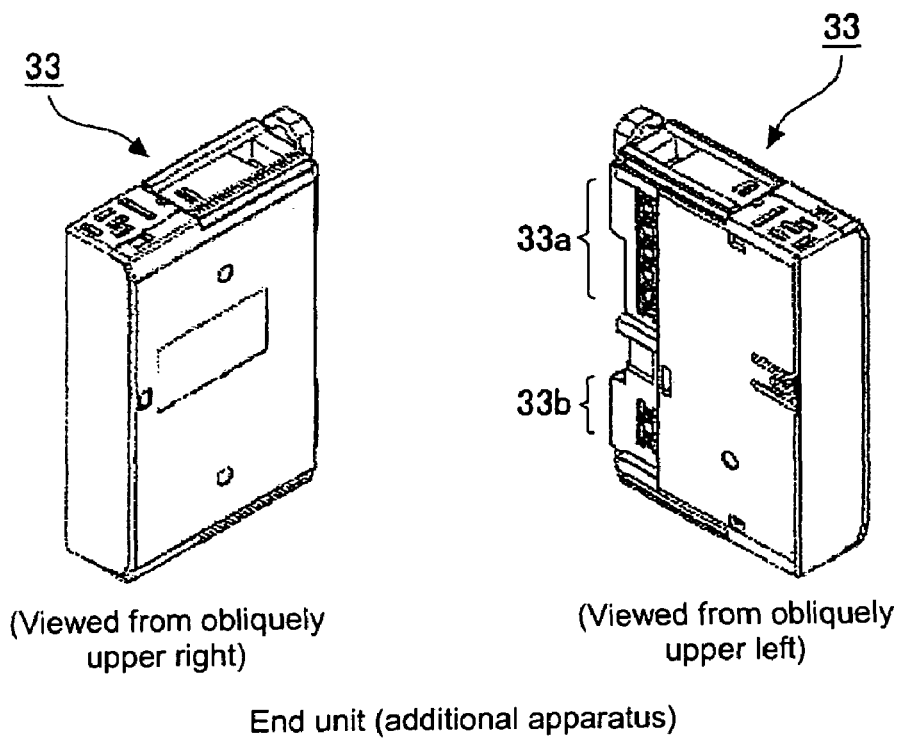

As shown in FIG. 7B, the external appearance configuration and internal configuration of the END unit (additional apparatus) 33 are similar to those of the above-described END unit (main apparatus), so that the description will be neglected. As is clear from FIG. 7B, the connector for the additional cable is not provided for the END unit (additional apparatus) 33.

Then, a setting process of the invention which is applied during the replacement of the I/O unit in the PLC system in which the pieces of remote terminal apparatus having the above configurations are incorporated into the network will be described in detail with reference to FIGS. 8 to 17. Hereinafter the system including the communication unit, the I/O unit, and the END unit is referred to as slice I/O system.

Figure 8:
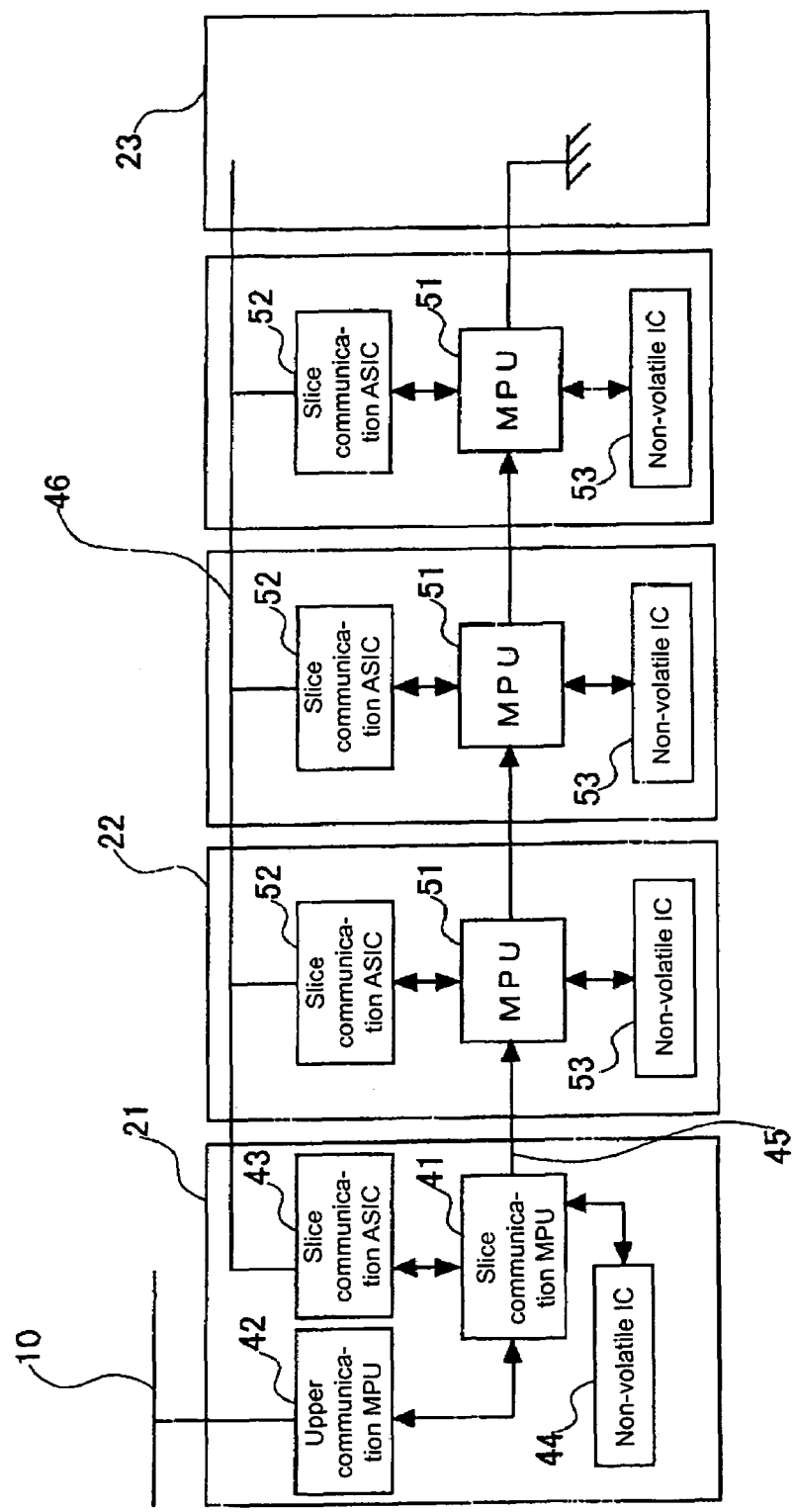
FIG. 8 shows a block diagram of a slice I/O system to which the invention is applied.

FIG. 8 shows a block diagram for explaining the slice I/O system according to the invention. The block diagram of FIG. 8 shows the remote terminal apparatus 2 in the structural diagram of the overall system previously described with reference to FIG. 1. Accordingly, components corresponding to the components shown in FIG. 1 are designated by the same numeral, and the description will be neglected. In FIG. 8, the numeral 10 designates an upper network, and the PLC (not shown) and the various settings (not shown) are connected to the upper network 10. Because the PLC and the various settings are already described with reference to FIG. 1, the description will be neglected.

As shown in FIG. 8, the communication unit 21 is connected to the upper network 10, the plural I/O units 22 (three, in this case) are connected to the communication unit 21, and further to the END unit 23 through the I/O unit 22.

As shown in FIG. 8, an upper communication MPU 42 accommodated in the communication unit 21 is connected to the upper network 10 to play a roll of the communication between the communication unit 21 and the upper network (PLC and the like). The upper communication MPU 42 is connected to a slice communication MPU 41. The slice communication MPU 41 is connected to MPU 51 through an address setting serial communication (A-set) 45. MPU 51 is built in the I/O unit 22 connected to the communication unit 21. The slice communication MPU 41 is connected to a slice communication ASIC 52 through a slice communication ASIC 43. The slice communication ASIC 52 is built in the I/O unit 22 connected to the communication unit 21. A non-volatile IC 44 is also connected to the slice communication MPU 41. Various setting values of each of the connected I/O unit 22 are stored in the non-volatile IC.

Figure 9:
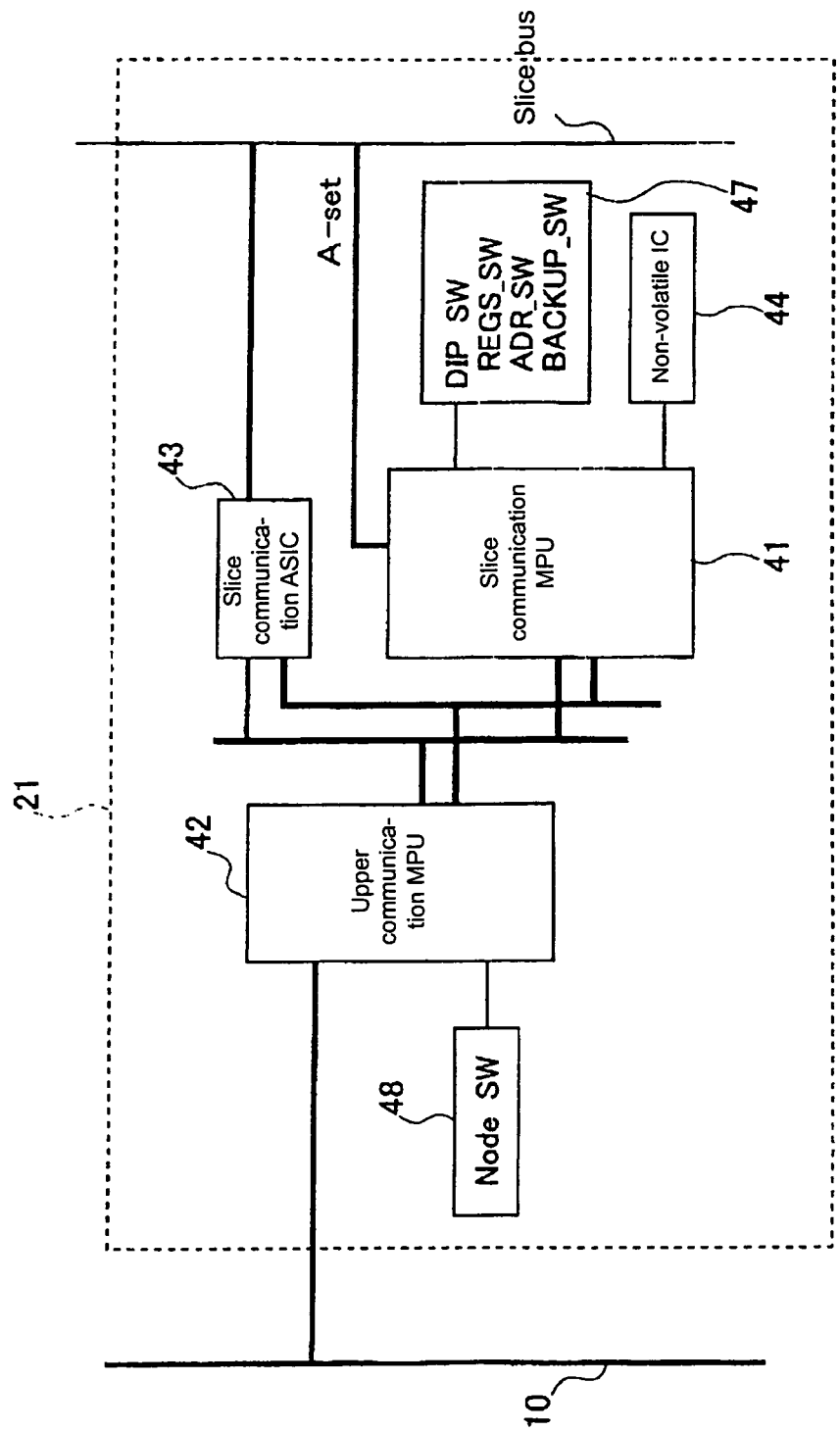
FIG. 9 shows a block diagram of a detailed communication unit to which the invention is applied.

FIG. 9 shows a block diagram of the detailed communication unit 21. In FIG. 9, the component corresponding to the component shown in FIG. 8 is designated by the same numeral, and the description will be neglected. As shown in FIG. 9, the upper communication MPU 42 includes a node switch (Node SW) 48. The node switch 48 functions as an upper-communication address setting switch. The slice communication MPU 41 includes a group of switches. In the embodiment, REG_SW, ADR_SW, and BACKUP_SW are included as a DIP switch. As used herein, REG_SW shall mean a switch which sets validity and invalidity of unit configuration function. The unit configuration can be stored at an ON edge. ADR_SW shall mean a switch which sets the validity and invalidity of restoration function. BACKUP_SW shall mean a backup trigger issuing switch as described later.

In the invention, when a trouble is generated due to a malfunction of the I/O unit in the above configuration, various pieces of information (setting values and the like) stored in the replaced I/O unit are transferred to the newly joined I/O unit. Therefore, when the I/O unit is newly joined into the network, as shown in FIG. 8, the pieces of information stored in the non-volatile IC 44 of the communication unit 21 are downloaded to the I/O unit.

A backup process according to the invention will first be described. The backup process shall mean a process storing the data of the I/O unit 22 in the non-volatile IC (non-volatile memory) 44 of the communication unit 21. The predetermined conditions are required to perform the backup process. Examples of the condition include full completion of the slice I/O system and no trouble (communication trouble) in the valid state of the unit configuration function. When the slice I/O system is not fully completed, the communication unit can not recognize the configuration of the connected I/O unit. In order to perform the data backup, it is necessary that the unit configuration be stored as a configuration table. The configuration table is produced by turning on REGS_SW, and the configuration of the I/O unit connected to the communication unit is stored at that time by the ON edge. The stored configuration can be destroyed by turning off REGS_SW. As used herein, the stored unit information shall mean information for identifying a model type of each I/O unit. The model type is uniquely specified by a unit kind, I/O points, a manufacturer, a product model number, and the like. The unit kind shall mean a kind such as an IN unit, an OUT unit, and a MIX unit. The manufacturer shall mean information on a vendor code (producing company code), a product code (unique value in each company), and the like. For example, the product model number shall mean information on a device type (unit type). The I/O unit configuration can be checked by arbitrarily selecting these pieces of information.

The reason why the conditions are adopted is as follows. Two ways of hot swap (the case where the replacement is performed while the power is turned on) and cold swap (the case where the replacement is performed while the power is turned off) can be assumed as means for replacing the units. For example, in the case where the replacement is performed while the power is turned off, unless the pre-replacement configuration is stored in the communication unit side, it can not be determined whether or not the newly replaced I/O unit is a data writing object. Therefore, it is necessary to store the information necessary to cause the communication unit to identify the connected unit.

Figure 17:
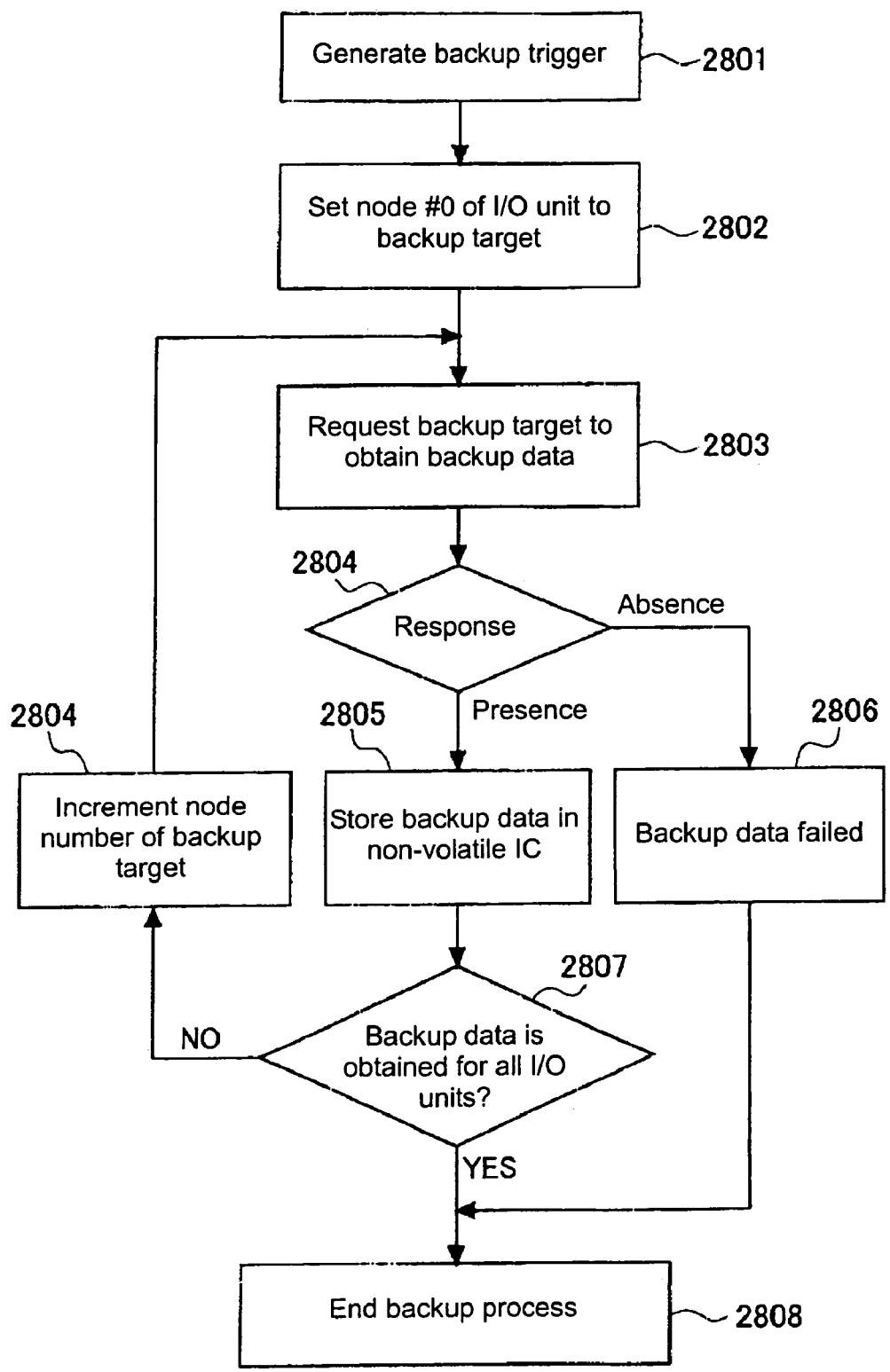
FIG. 17 shows a flowchart of a backup process performed by the communication unit.
Figure 18:
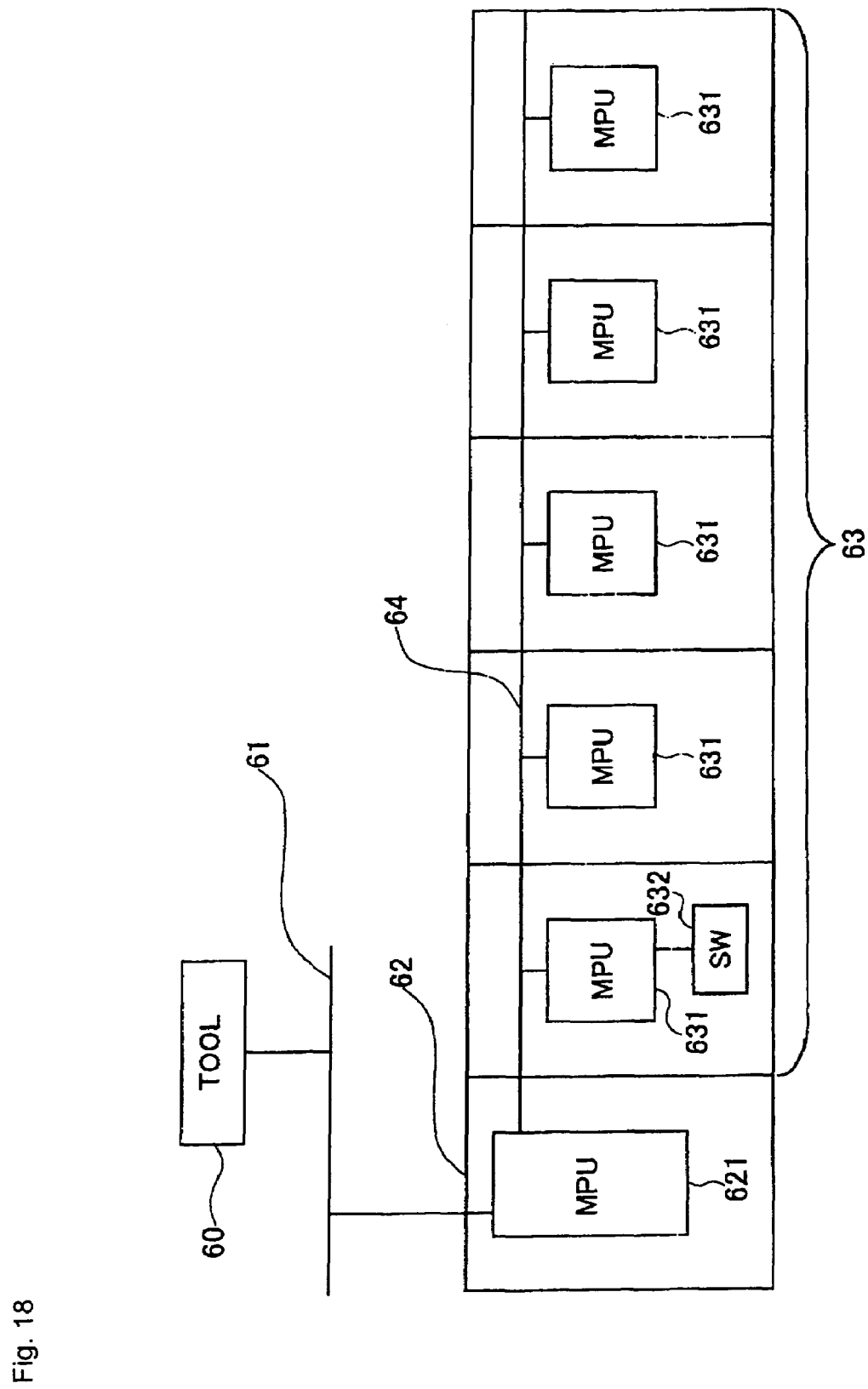
FIG. 18 shows a block diagram of the communication unit and I/O unit in a conventional PLC system.

FIG. 17 shows a flowchart of a backup process performed by the communication unit 21. As shown in FIG. 17, it is necessary to generate the backup trigger. In the embodiment, the backup trigger is configured to be generated by switching BACKUP_SW ON, OFF, and ON for three seconds from an off state. Obviously, the backup trigger may be generated by another operation. That is, the backup trigger may be an unexpected operation in the normal usage state that can happen only when the backup trigger is intended. When the backup trigger is generated (Step 2801), Node #0 of the I/O unit 22 is set at a backup target (Step 2802). Then, a backup data obtaining request is performed to the backup target (Step 2803). When a response to the backup data obtaining request comes back (YES in Step 2804), backup data of the I/O unit is stored in the non-volatile IC 44 of the communication unit 21 (Step 2805).

As used herein, the backup data shall means data concerning the setting for operating the I/O unit which is held before and after the replacement. Examples of the backup data include information which a user arbitrarily sets to operate the I/O unit and management information for managing the I/O unit. Examples of the information which a user arbitrarily sets to operate the I/O unit include setting information whether or not the OUT data is held in the case where the I/O unit has the communication trouble, setting information concerning a communication protocol between the I/O unit and the communication unit, and setting values (the number of ON times of the terminal, ON-time threshold, and the like) concerning an original function of the I/O unit. Examples of the management information for managing the I/O unit include a name of the I/O unit of itself. The name of the I/O unit is a logical name, a number, a character string, or the like which the user arbitrarily gives, and the name of the I/O unit corresponds to the information described in a unit information description field on an information display surface of a terminal information index 224. Examples of the management information for managing the remote terminal apparatus also include the name of control device (including the name of the input device and the name of the output device) for managing the control device connected to the I/O unit and the terminal name of the I/O terminal. Each name is expressed by the logical name, the number, the character string, or the like which the user arbitrarily gives. The terminal name is each name of the terminals 223a and 223b in the terminal support block 223 of the I/O unit, and the terminal name corresponds to the information such as a line number described in a terminal information description field on the information display surface of the terminal information index 224.

Then, it is determined whether or not the backup data is obtained for all the I/O units 22. When the backup data is obtained for all the I/O units 22 (YES in Step 2807), the backup process is ended (Step 2808). When the backup data is not obtained for all the I/O units 22, the node number of the backup target is incremented (Step 2809), the flow returns to Step 2803 to perform the backup data obtaining request to the backup target. When the response to the backup data obtaining request does not come back in Step 2804 (NO in Step 2804), the backup process fails to the backup (Step 2806), and the backup process is ended (Step 2808).

Thus, the communication unit can perform the backup irrespective of the model by standardizing the backup procedure to the I/O unit.

Then, a restoration process will be described. In the restoration process, the data of the I/O unit in which the backup is performed in the above-described manner is downloaded to the newly replaced I/O unit during the unit replacement or the like, and thereby the various kinds of setting data of the pre-replacement unit are directly transferred to the new unit.

The predetermined conditions are set in performing the data download in association with the restoration process. The reason why the conditions are adopted is as follows. For example, when the OUT unit is wrongly attached although the kind of the newly replaced I/O unit should be the IN unit, there is generated a problem that the OUT unit malfunctions because the incorrect data is written. In the case where the detached unit is directly attached again due to maintenance or the like, it is not necessary to download the data again. With the background like that, in joining the I/O unit, it is necessary to determine the unit type and a change in serial number which is uniquely set to all the units (namely, the unit is newly attached). An I/O unit join process performed to determine the unit type and the change in serial number will be described below.

Figure 10:
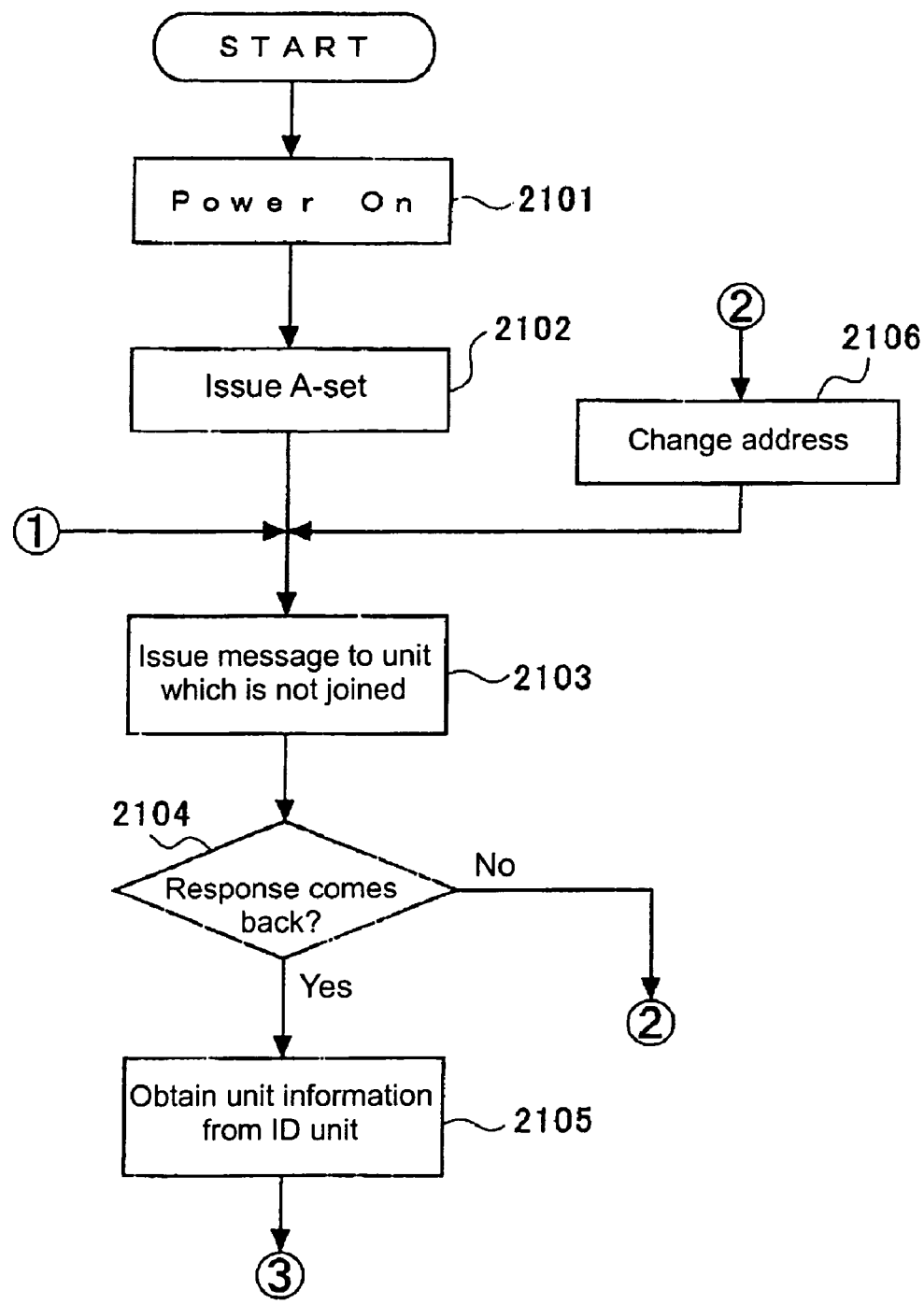
FIG. 10 shows a flowchart (first half) of an initial join process performed by a communication unit.
Figure 11:
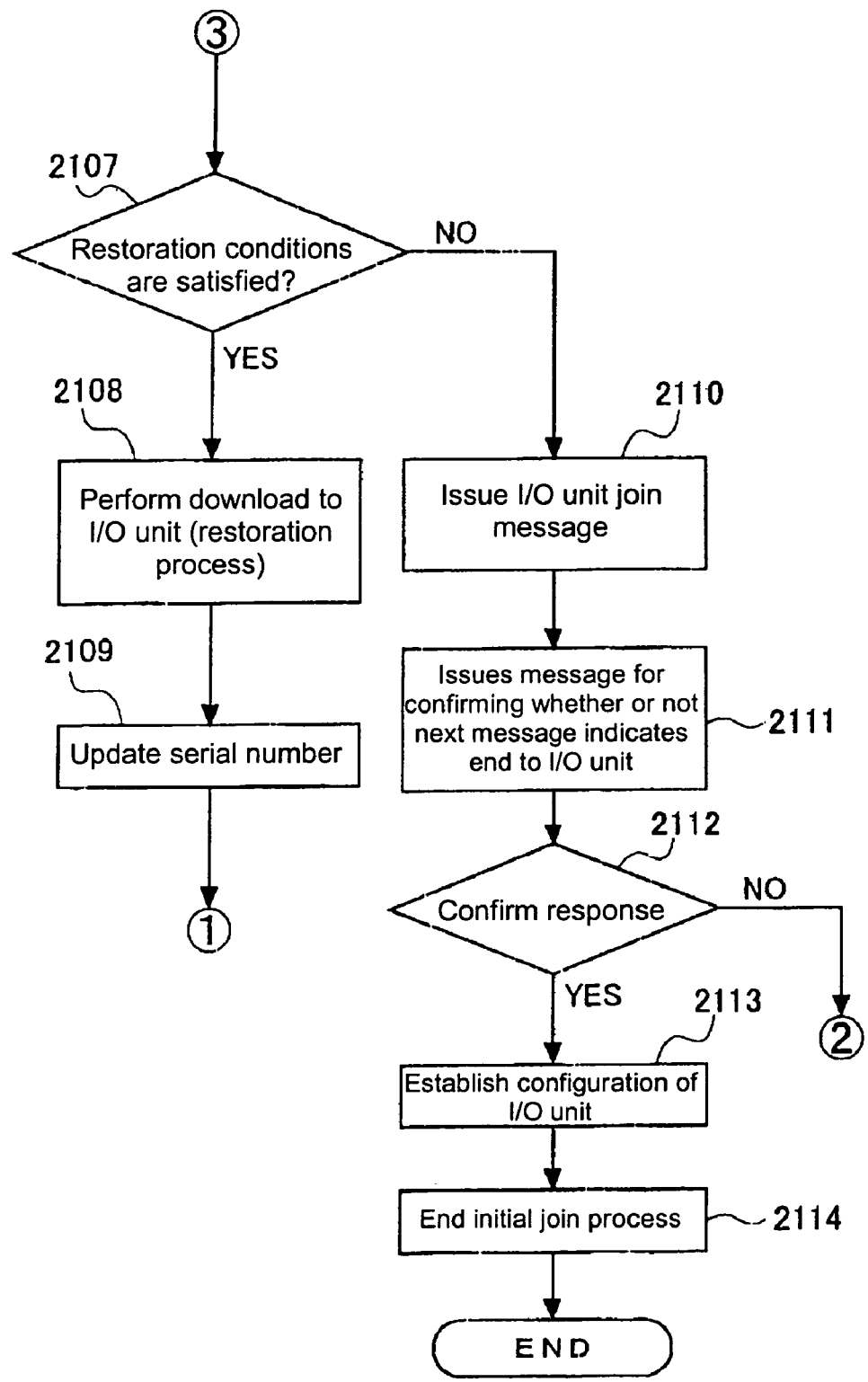
FIG. 11 shows a flowchart (second half of the initial join process performed by the communication unit.

FIGS. 10 and 11 show a flowchart of an initial join process performed by the communication unit. As shown in FIGS. 10 and 11, the initial join process is performed after the power is turned on (Step 2101), and A-set is issued (Step 2102). As used herein, A-set shall mean serial communication for notifying the address. Then, the communication unit issues a message to the I/O unit which is not joined (Step 2103), and the communication unit waits for the response. When the response comes back (YES in Step 2104), the communication unit obtains the information from an ID unit (Step 2105). When the response does not come back (NO in Step 2104), the address is changed (Step 2106), the flow returns to Step 2103, and the communication unit issues a message to the I/O unit which is not joined.

When the information is obtained from the ID unit in Step 2105, it is determined whether or not the I/O unit satisfies the later-described restoration conditions. When the I/O unit satisfies the restoration conditions (YES in Step 2107), the data is downloaded to the I/O unit to perform the restoration process (Step 2108). When the restoration process is completed, the serial number is updated (Step 2109), the flow returns to Step 2103 to resume the process.

Back to Step 2107, when the target I/O unit does not satisfy the restoration conditions (NO in Step 2107), the communication unit issues a join message to the I/O unit (Step 2110). The communication unit issues a confirmation message for confirming whether or not the next message indicates the end to the I/O unit (Step 2111). When the communication unit confirms the response in Step 2112 (YES in Step 2112), the configuration of the I/O unit is established (Step 2113), and the initial join process is completed (Step 2114). When the communication unit does not confirm the response (NO in Step 2112), the flow returns to Step 2106, and the address is changed to repeat the processes.

Figure 12:
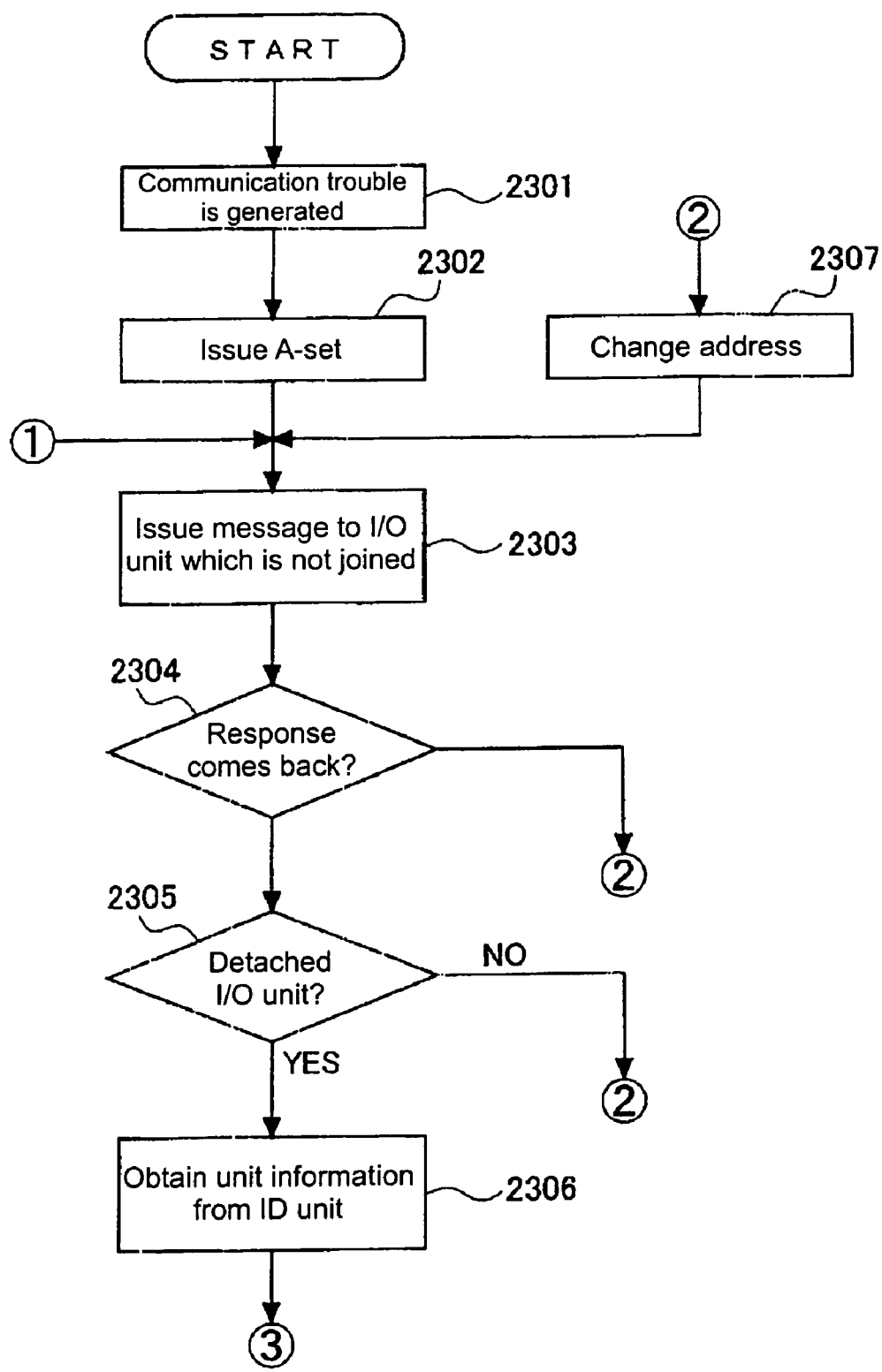
FIG. 12 shows a flowchart (first half) of a midstream join process performed by the communication unit.
Figure 13:
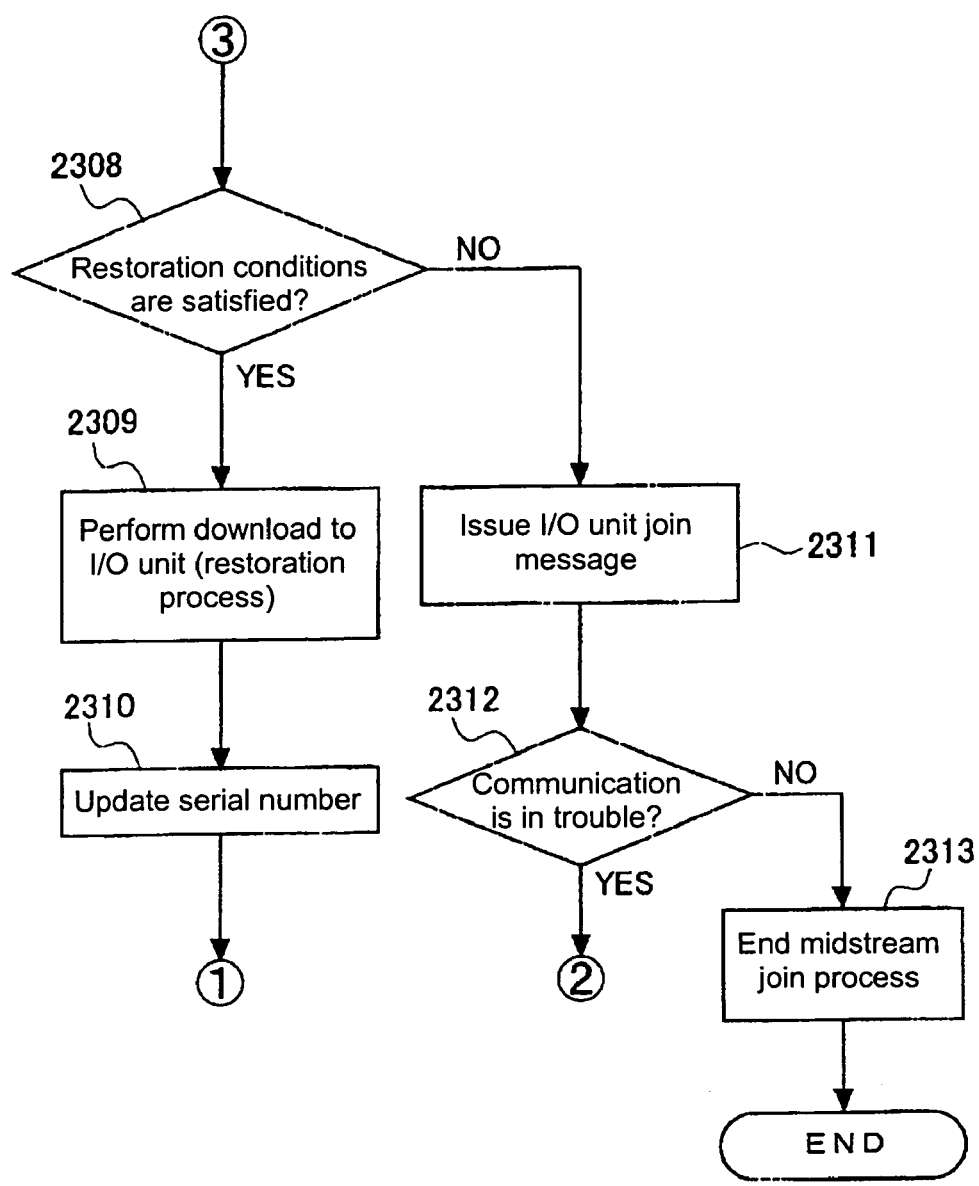
FIG. 13 shows a flowchart (second half of the midstream join process performed by the communication unit.

Then, a midstream join process performed by the communication unit 21 will be described in detail with reference to flowcharts shown in FIGS. 12 and 13. As used herein, the midstream join shall mean the case in which the I/O unit is replaced due to failure or the like while the electric current is passed in the I/O unit 22 connected to the communication unit 21. The communication trouble is generated due to the failure of the I/O unit or the like (Step 2301). When the communication trouble is generated, A-set is issued (Step 2302). The message is issued to the I/O unit which is not joined (Step 2303). When the response comes back (YES in Step 2304), it is determined whether or not the I/O unit is the detached unit (YES in Step 2305). When the I/O unit is the detached unit (YES in Step 2305), the unit information is obtained from the ID unit (Step 2306). When the response does not come back in Step 2304 (NO in Step 2304), the address is changed (Step 2307), and the flow returns to Step 2303. When the I/O unit is not the detached unit in Step 2305 (NO in Step 2305), the address is changed (Step 2307), and the flow returns to Step 2303. In the case where the detachment is not detected while the already joined node is joined, the I/O unit is not joined.

After the unit information is obtained from the ID unit in Step 2306, it is determined whether or not the I/O unit satisfies the restoration conditions (Step 2308). When the I/O unit satisfies the restoration conditions (YES in Step 2308), the data is downloaded to the I/O unit to perform the restoration process (Step 2309). Then, the serial number is updated (Step 2310), and the flow returns to Step 2303 to resume the process. When the I/O unit does not satisfy the restoration conditions (NO in Step 2308), the I/O unit join message is issued (Step 2311), and it is determined whether or not the communication is in trouble (Step 2312). When the communication is in trouble (YES in Step 2312), the flow returns to Step 2307, and the address is changed to resume the process. When the communication is not in trouble (NO in Step 2312), the midstream join process is ended (Step 2313).

Figure 14:
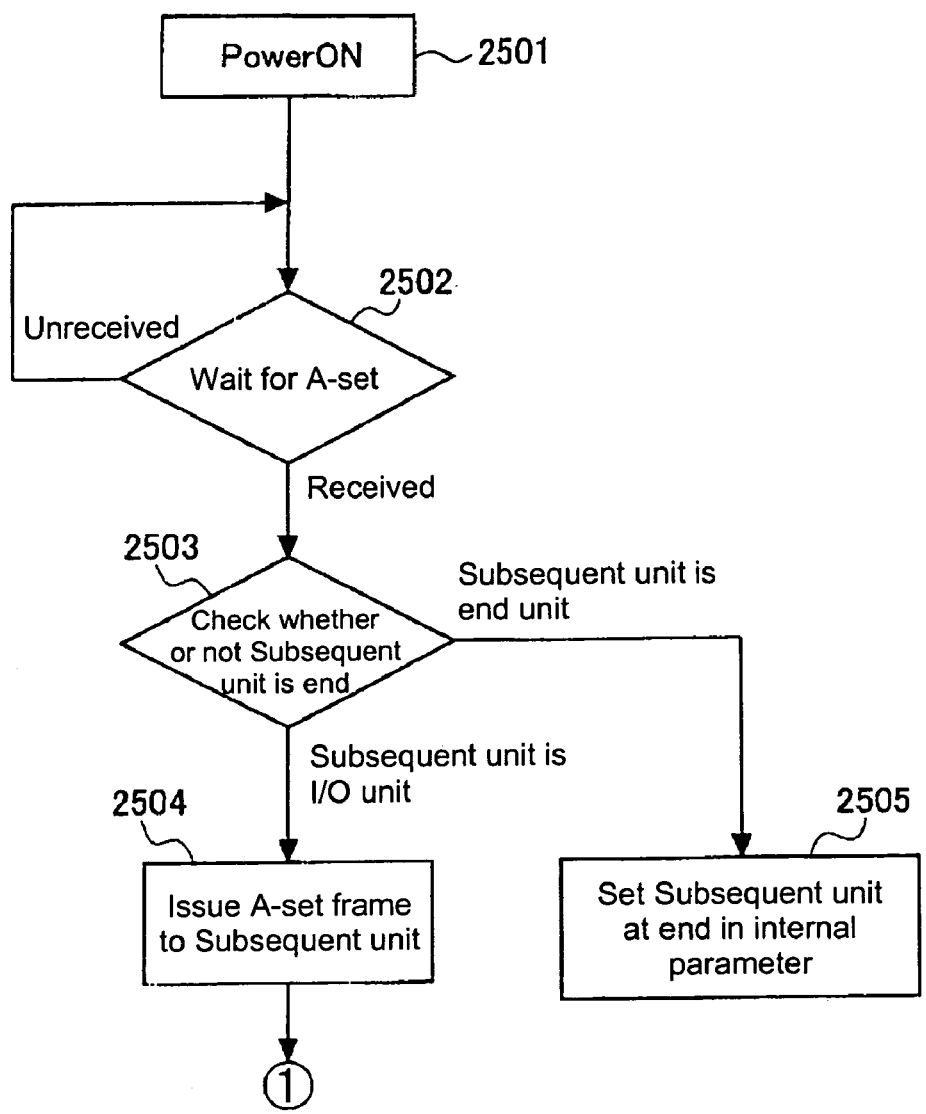
FIG. 14 shows a flowchart (first half) of the initial join process performed by the I/O unit.
Figure 15:
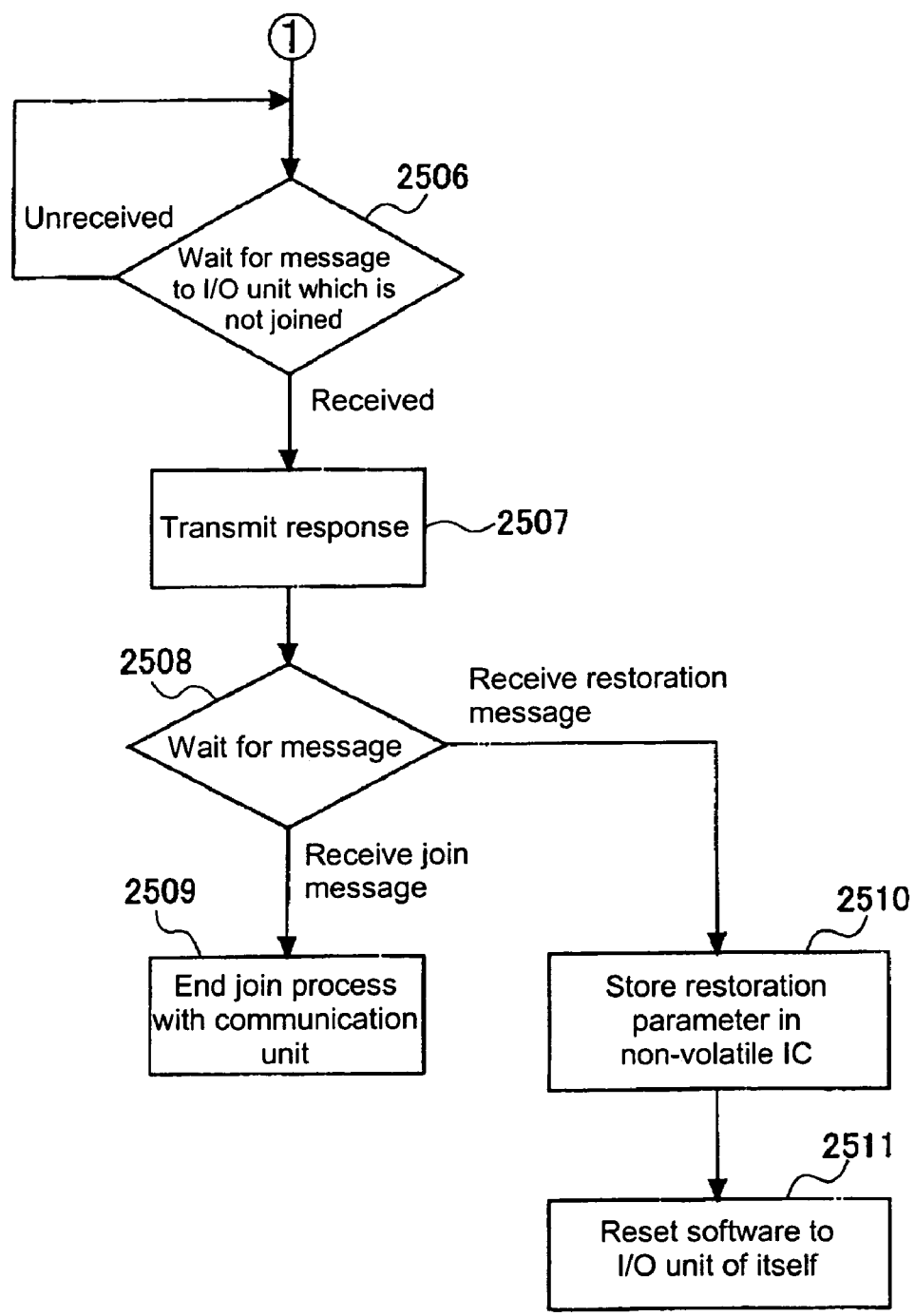
FIG. 15 shows a flowchart (second half) of the initial join process performed by the I/O unit.

Then, the initial join process on the side of the I/O unit 22 will be described with reference to flowcharts shown in FIGS. 14 and 15. After the power is turned on (Step 2501), the I/O unit side waits for A-set transmitted from the communication unit (Step 2502, and NO in Step 2502). When the A-set is received from the communication unit (YES in Step 2502), it is checked whether or not the unit connected subsequent to the I/O unit of itself is the end unit (Step 2503). When the unit connected subsequent to the I/O unit of itself is the END unit (subsequent unit is END unit in Step 2503), the subsequent unit is set at the END unit in the internal parameter (Step 2505). When the subsequent unit is not the END unit (subsequent unit is I/O unit in Step 2503,), the A-set frame is issued to the subsequent unit (Step 2504).

When the A-set frame is issued to the subsequent unit, the I/O unit side waits for the message to the unit which is not joined (Step 2506, and unreceived in Step 2506). When the message to the unit which is not joined is received (received in Step 2506), the response to the message is transmitted (Step 2508). The response includes the unit information for determining whether or not the restoration conditions are satisfied on the communication unit side. After the response is transmitted, the I/O unit side waits for the further message from the communication unit 21 (Step 2508). When the message transmitted from the communication unit 21 is the join message (join message reception in Step 2508), the join process with the communication unit 21 is ended (Step 2509). On the other hand, when the message transmitted from the communication unit 21 is the restoration message (restoration message reception in Step 2508), the restoration parameter is stored in the non-volatile IC 53 (Step 2510), and software reset is performed to the I/O unit of itself (Step 2511).

Figure 16:
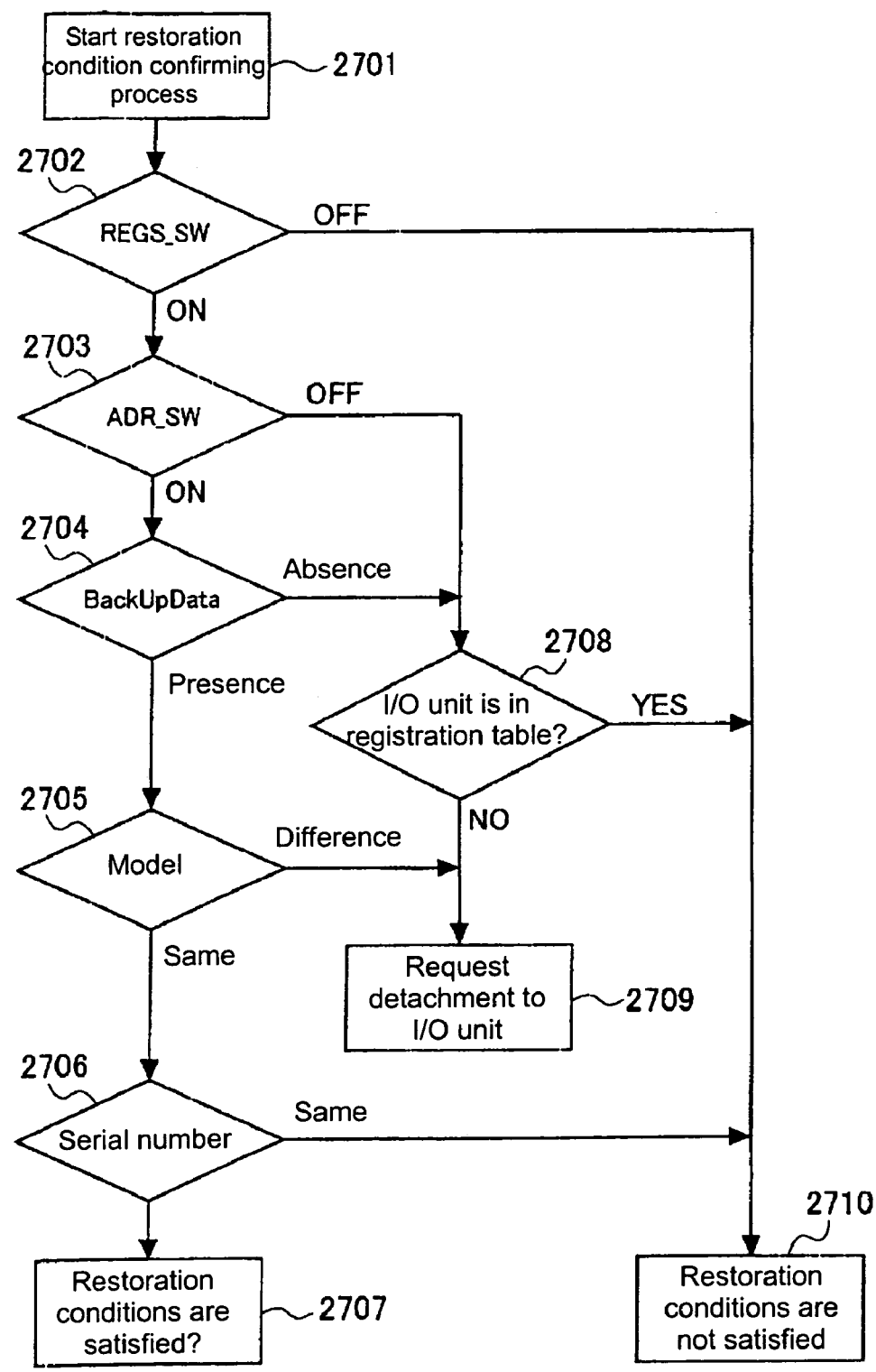
FIG. 16 shows a flowchart of a restoration condition confirming process performed by the communication unit.

Then, a restoration condition confirming process performed by the communication unit 21 will be described with reference to a flowchart shown in FIG. 16. Through the restoration condition confirming process, the communication unit 21 can determine whether or not the I/O unit which is of the target in the initial join process and midstream join process satisfies the restoration process. When the restoration condition confirming process is performed (Step 2701), it is determined whether REGS_SW is turned on or off (Step 2702). When REGS_SW is turned off (OFF in Step 2702), it is determined that the restoration conditions are not satisfied (Step 2710). When REGS_SW is turned on (ON in Step 2702), the state of ADR_SW is confirmed (Step 2703). When ADR_SW is turned on (ON in Step 2703), it is confirmed whether or not the backup data exists (Step 2704). When the backup data exists (YES in Step 2704), it is determined whether or not a model number of the backup data is the same as that of the subsequent backup data (Step 2705). When the model number of the backup data is the same as that of the subsequent backup data (SAME in Step 2705), the determination of serial number is made (Step S2706). When the serial number is different (DIFFERENT in Step 2706), the restoration conditions are considered to be satisfied (Step 2707). When the serial number is the same (SAME in Step 2706), the restoration conditions are considered to be not satisfied (Step 2710).

Back to Step S2703, when ADR_SW is turned off (OFF in Step 2703), it is determined whether or not the I/O unit is the unit in a registration table (Step 2708). When the backup data does not exist in Step 2704 (NO in Step 2704), the flow goes to Step 2708, and it is also determined whether or not the I/O unit is the unit in the registration table. When the I/O unit is the unit in the registration table (YES in Step 2708), the restoration conditions are considered to be not satisfied (Step 2710). When the I/O unit is not the unit in the registration table (NO in Step 2708), the detachment is requested to the I/O unit (Step 2709). Back to Step S2705, in the case where REGS_SW and ADR_SW are turned on while the backup data exists but the model number is different (DIFFERENCE in Step 2705), the detachment is requested to the I/O unit (Step 2709).

As is clear from the above description, in the initial process or in performing the unit replacement while the electric current is passed through the I/O unit, the communication unit 21 compares the backup data of the already registered I/O unit and the data of the newly joined I/O unit during the resumption, and the communication unit 21 can download the backup data to the I/O unit when the restoration conditions are satisfied. After the restoration process is normally ended, the serial number of the I/O unit, which is stored in the communication unit 21, is updated to prevent repetition of the restoration process when the system is started up again.

In the programmable-controller remote terminal apparatus of the invention described above, in the I/O unit having the three-divided configuration of the remote terminal apparatus in which the miniaturization and low-profile are developed, the setting can be performed with no tool to shorten the system down time when the I/O unit is replaced during the current-conducting state or during the down state. Furthermore, the human-induced mistake such as the operation error of the switch can also be prevented by automatically performing the setting process.

What is claimed is:

1. A programmable controller remote terminal apparatus connectable to a programmable controller through a fieldbus, said programmable controller being adapted to capture IN data from an input device through the fieldbus, perform logic operation for the captured IN data with a user program, and transmit OUT data as a result of the operation to an output device though the fieldbus, the apparatus comprising:
    a communication unit which is configured to communicate IN data or OUT data with the programmable controller through the fieldbus; and
    a plurality of Input/Output (I/O) units to each of which at least either one of the input device or the output device is connected and each of which is configured to communicate with the communication unit through a serial bus line, the communication unit comprising:
        a device which obtains unit information for identifying a model type for each I/O unit connected through the serial bus line and setting value information set for operating said each I/O unit,
        a backup device configured to store the unit information and setting value information of each I/O unit in a storage medium included in the communication unit, and
        a restoration device for transferring the setting value information stored by the backup device to a newly joined I/O unit,
    wherein the communication unit is configured to recognize the presence of an I/O unit comprising information different from the backup information among the connected I/O units through the serial bus line by comparing unit information and setting value information of each I/O unit obtained by the obtaining device to the unit information and the setting value information stored in the storage medium of the backup device.

2. The programmable controller remote terminal apparatus according to claim 1, wherein the communication unit recognizes the I/O unit comprising the unit information and the setting value information different from the stored unit information and the stored setting value information as a newly joined I/O unit; and the restoration device transfers the stored setting value information on the I/O unit to the newly joined I/O unit, the setting value information of the VO unit being stored by the backup device before its replacement.

3. The programmable-controller remote terminal apparatus according to claim 2, wherein
    the communication unit has a restoration condition confirming device which determines whether or not the newly joined I/O unit satisfies predetermined restoration conditions, and
    the restoration device automatically transfers the stored setting value information on the replaced I/O unit to the newly joined I/O unit by downloading the backup information of the replaced I/O unit to the newly joined I/O unit when the restoration conditions are satisfied.

4. The programmable-controller remote terminal apparatus according to claim 3, wherein
    the predetermined restoration conditions by the restoration condition confirming device are satisfied only when the I/O unit connected to the communication unit has been replaced and the I/O unit before replacement and the I/O unit after replacement are of the same model type.

* * * * *